United States Patent
Mariaux et al.

(10) Patent No.: US 11,203,801 B2
(45) Date of Patent: Dec. 21, 2021

(54) AGE-HARDENABLE AND HIGHLY FORMABLE ALUMINUM ALLOYS AND METHODS OF MAKING THE SAME

(71) Applicant: Novelis Inc., Atlanta, GA (US)

(72) Inventors: Aurèle Mariaux, Sierre (CH); Aude Celine Despois, Grone (CH); Milan Felberbaum, Lausanne (CH); Guillaume Florey, Veyras (CH)

(73) Assignee: NOVELIS INC., Atlanta, GA (US)

( * ) Notice: Subject to any disclaimer, the term of this patent is extended or adjusted under 35 U.S.C. 154(b) by 0 days.

(21) Appl. No.: 16/815,996

(22) Filed: Mar. 11, 2020

(65) Prior Publication Data
US 2020/0291503 A1  Sep. 17, 2020

Related U.S. Application Data

(60) Provisional application No. 62/817,713, filed on Mar. 13, 2019.

(51) Int. Cl.
*B32B 15/01* (2006.01)
*C22C 21/08* (2006.01)
*C22F 1/047* (2006.01)

(52) U.S. Cl.
CPC ............ *C22C 21/08* (2013.01); *B32B 15/016* (2013.01); *C22F 1/047* (2013.01); *Y10T 428/12764* (2015.01)

(58) Field of Classification Search
None
See application file for complete search history.

(56) References Cited

U.S. PATENT DOCUMENTS

| | | | |
|---|---|---|---|
| 3,496,620 A | * | 2/1970 | Wolfe, Jr. ............. B32B 15/016 428/654 |
| 4,039,355 A | | 8/1977 | Takahashi et al. |
| 4,169,728 A | | 10/1979 | Komori et al. |
| 4,174,232 A | | 11/1979 | Lenz et al. |
| 4,231,817 A | | 11/1980 | Takeuchi et al. |
| 4,260,419 A | | 4/1981 | Robertson |
| 4,619,712 A | | 10/1986 | Miyamoto et al. |

(Continued)

FOREIGN PATENT DOCUMENTS

| AU | 2126799 | 9/1999 |
|---|---|---|
| CA | 1100338 | 5/1981 |

(Continued)

OTHER PUBLICATIONS

Davis, J.R . . . (1993). ASM Specialty Handbook—Aluminum and Aluminum Alloys—3. Physical Metallurgy. ASM International. (Year: 1993).*

(Continued)

*Primary Examiner* — Daniel J. Schleis
(74) *Attorney, Agent, or Firm* — Kilpatrick Townsend & Stockton LLP

(57) ABSTRACT

Provided herein are new aluminum alloy products and methods of making these alloys. The aluminum alloy products are age-hardenable, display high strength and formability, and allow for the use of recycled scrap. The aluminum alloys can serve as the core in a clad aluminum alloy product. The alloy products can be used in a variety of applications, including automotive, transportation, and electronics applications.

16 Claims, 7 Drawing Sheets

(56) References Cited

U.S. PATENT DOCUMENTS

| | | | |
|---|---|---|---|
| 4,645,544 | A | 2/1987 | Baba et al. |
| 4,814,022 | A | 3/1989 | Constant et al. |
| 4,828,936 | A | 5/1989 | Toma et al. |
| 5,634,991 | A | 6/1997 | Kamat |
| 6,848,233 | B1 * | 2/2005 | Haszler .............. B32B 3/28 52/783.17 |
| 7,472,740 | B2 | 1/2009 | Anderson et al. |
| 7,572,521 | B2 | 8/2009 | Mergen et al. |
| 7,748,434 | B2 | 7/2010 | Wagstaff |
| 7,926,701 | B2 * | 4/2011 | Dulac ............... B32B 15/016 228/262.51 |
| 8,025,748 | B2 | 9/2011 | Parson et al. |
| 8,413,876 | B2 * | 4/2013 | Dulac ............... B23K 1/0012 228/219 |
| 8,668,993 | B2 | 3/2014 | Tatsumi et al. |
| 8,763,880 | B2 * | 7/2014 | Wittebrood .......... C22C 21/02 228/56.3 |
| 8,927,113 | B2 | 1/2015 | Anderson et al. |
| 8,999,079 | B2 | 4/2015 | Kamat et al. |
| 9,663,847 | B2 | 5/2017 | Kim et al. |
| 10,246,762 | B2 | 4/2019 | Goto et al. |
| 10,533,243 | B2 | 1/2020 | Newman et al. |
| 10,550,455 | B2 | 2/2020 | Hosch et al. |
| 2001/0007720 | A1 * | 7/2001 | Soga ............... F28F 21/084 428/654 |
| 2001/0028860 | A1 | 10/2001 | Fang et al. |
| 2002/0088512 | A1 | 7/2002 | Kitaoka et al. |
| 2003/0026725 | A1 | 2/2003 | Sawtell et al. |
| 2003/0102060 | A1 | 6/2003 | Daaland et al. |
| 2005/0000604 | A1 | 1/2005 | Kawahara et al. |
| 2005/0028894 | A1 | 2/2005 | Hoffmann et al. |
| 2005/0155676 | A1 | 7/2005 | Cosse et al. |
| 2005/0173032 | A1 | 8/2005 | Koch et al. |
| 2005/0262967 | A1 * | 12/2005 | Leon ............... C22B 7/004 75/401 |
| 2005/0288894 | A1 | 12/2005 | Vorenkamp et al. |
| 2006/0185816 | A1 * | 8/2006 | Anderson ........... B22D 11/103 164/461 |
| 2010/0316887 | A1 | 12/2010 | Dwenger |
| 2012/0237694 | A1 | 9/2012 | Lorentzen et al. |
| 2015/0337413 | A1 | 11/2015 | Kim |
| 2018/0274072 | A1 * | 9/2018 | Das ............... C22B 21/0092 |

FOREIGN PATENT DOCUMENTS

| | | |
|---|---|---|
| CN | 100478476 | 4/2009 |
| CN | 101935787 | 7/2012 |
| CN | 102876943 | 1/2013 |
| CN | 102952971 | 3/2013 |
| CN | 103160719 | 6/2013 |
| CN | 103173667 | 6/2013 |
| CN | 103326296 | 9/2013 |
| CN | 103397230 | 11/2013 |
| CN | 103469014 | 12/2013 |
| CN | 103667803 | 3/2014 |
| CN | 104046853 | 9/2014 |
| CN | 104451290 | 3/2015 |
| CN | 105039809 | 11/2015 |
| CN | 109207816 | 1/2019 |
| CN | 109207817 | 1/2019 |
| CN | 109355532 | 2/2019 |
| DE | 4417521 | 11/1995 |
| DE | 202004007397 | 7/2004 |
| EP | 0908527 | 4/1999 |
| EP | 1104815 | 6/2001 |
| EP | 3362583 | 8/2018 |
| EP | 3418409 | 4/2020 |
| FR | 2944029 | 4/2011 |
| GB | 1285678 | 8/1972 |
| JP | H08505904 | 6/1996 |
| JP | H08176711 | 7/1996 |
| JP | 2000129382 | * 10/1998 |
| JP | 2017066502 | 4/2017 |
| KR | 100892176 | 4/2009 |
| WO | 9412677 | 6/1994 |
| WO | 2016077044 | 5/2016 |
| WO | 2017159054 | 9/2017 |
| WO | 2018136382 | 7/2018 |

OTHER PUBLICATIONS

International Alloy Designations and Chemical Composition Limits for Wrought Aluminum and Wrought Aluminum Alloys; The Aluminum Association; Jan. 2015. (Year: 2015).*

International Application No. PCT/US2020/022133, International Search Report and Written Opinion dated Jun. 5, 2020, 12 pages.

* cited by examiner

AGE-HARDENABLE AND HIGHLY FORMABLE ALUMINUM ALLOYS AND METHODS OF MAKING THE SAME

CROSS REFERENCE TO RELATED APPLICATION

This application claims priority to U.S. Provisional Application No. 62/817,713, filed on Mar. 13, 2019, the entire contents and disclosure of which are incorporated herein.

FIELD

Provided herein are novel aluminum alloys, products made from these novel alloys, and methods of making these alloys and products. The new aluminum alloys and products are suitable for a variety of applications, including automotive and electronic applications. The aluminum alloys can serve as a monolithic product, as a core layer in a clad aluminum alloy product or as a clad layer in a clad aluminum alloy product, for example. The aluminum alloy products are age-hardenable, display high strength and formability, and allow for the use of recycled scrap.

BACKGROUND

Current highly formable alloys are, for example, 6xxx series aluminum alloys with high silicon levels, or 5xxx series aluminum alloys that have no age hardening potential. Adding silicon to 5xxx series aluminum alloys in an attempt to make them age-hardenable fails because 5xxx series aluminum alloys have very limited solubility for silicon, even at high temperature. Thus, a solutionizing treatment is not feasible and age hardening does not work. Accordingly, highly formable alloys with high strength and the ability to be age hardened are desirable.

Further, it is advantageous if aluminum alloys can incorporate recycled scrap. Incorporating recycled scrap leads to decreased cost and time associated with producing primary aluminum, as well as the desirability of recycling. Recycled scrap, however, may be unsuitable for use in preparing high performance aluminum alloys as the recycled scrap may contain high levels of certain undesirable elements. For example, the recycled scrap may include certain elements in amounts that affect the mechanical properties of the aluminum alloys, such as formability and strength.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Provided herein are new aluminum alloys and aluminum alloy products and methods of making these aluminum alloys and products. The aluminum alloys and products possess a combination of high formability, high strength, age-hardenability, and allow for the use of recycled materials in their formation. The aluminum alloys as described herein comprise magnesium (Mg) and silicon (Si), among other optional elements. Thus, in some aspects, the aluminum alloys as described herein can comprising from about 0.5 wt. % to about 1.6 wt. % Mg; from about 0.2 wt. % to about 0.5 wt. % Si; up to about 1.0 wt. % Fe; up to about 0.5 wt. % Cu; up to about 0.5 wt. % Mn; up to about 0.3 wt. % Cr; up to about 0.3 wt. % Ti; up to about 0.5 wt. % Zn; up to about 0.25 wt. % impurities; and Al. In some aspects, the weight ratio of Mg to Si in the aluminum alloy can be from about 8:1 to about 1.5:1.

The aluminum alloys as described herein can serve as a monolithic product, such as a sheet, a shate, or a plate, comprising the aluminum alloys described herein. The aluminum alloys as described herein can also serve as the core layer in a clad metal product, for example. Such core layers (comprising the aluminum alloys described herein) can be combined with at least one clad layer to form the clad metal product. The aluminum alloys as described herein can also serve as the clad layer in a clad metal product, for example. The clad aluminum alloy products can include automotive products (e.g., automotive structural parts), aerospace products (e.g., an aerospace structural part or an aerospace non-structural part), marine products (e.g., a marine structural part or a marine non-structural part), or electronic products (e.g., electronic device housings), as examples. Further provided are aluminum alloy sheets, plates, and shates comprising a clad aluminum alloy product as described herein.

Other objects and advantages will be apparent from the following detailed description of non-limiting examples.

DETAILED DESCRIPTION

Figure 1:
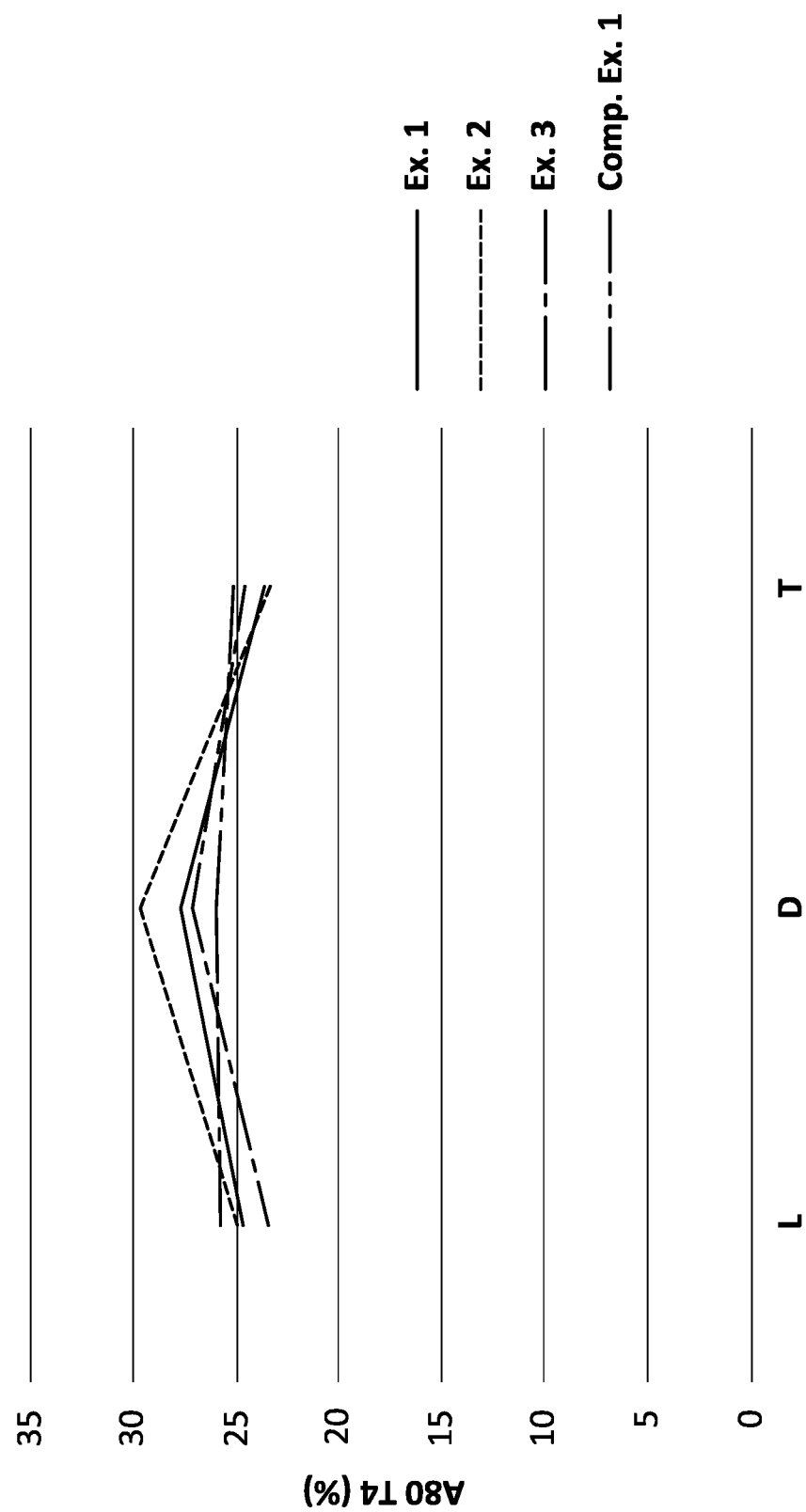
FIG. 1 is a graph of total elongation (A80) in longitudinal (L), diagonal (D), and transverse (T) directions for aluminum alloy samples.
Figure 2:
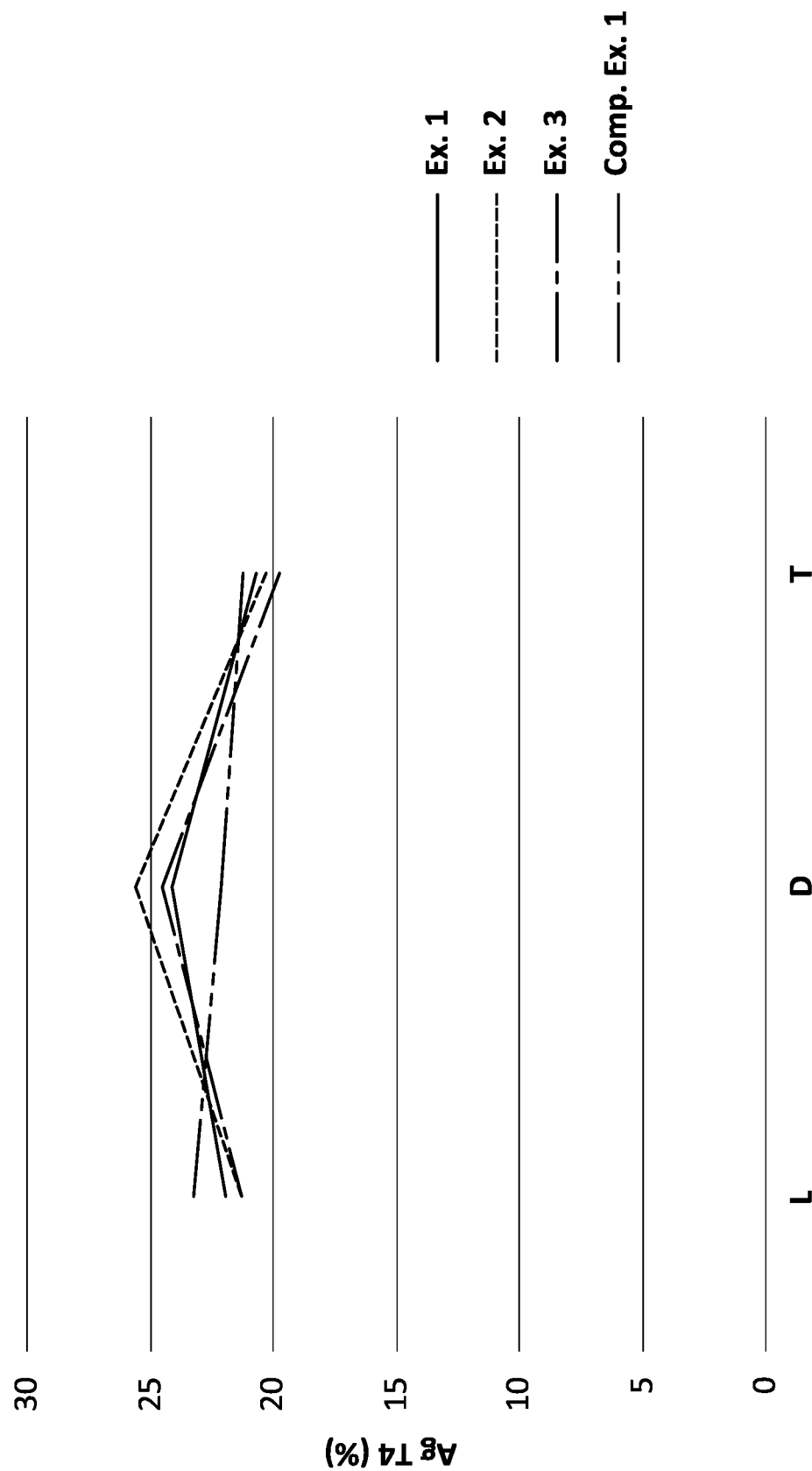
FIG. 2 is a graph of uniform elongation (Ag) in longitudinal (L), diagonal (D), and transverse (T) directions for aluminum alloy samples.

Described herein are new aluminum alloys and aluminum alloy products that comprise amounts of aluminum (Al), magnesium (Mg), and Silicon (Si), along with other elements. In some aspects, the new aluminum alloys can be core layers and/or clad layers in clad products. The aluminum alloys and aluminum alloy products possess a combination of high formability, high strength, age-hardenability, and allow for the use of recycled materials in their formation. The inventors surprisingly discovered that highly formable alloys can be prepared using aluminum alloys, for example a 5xxx series aluminum alloy with relatively low Mg content or a 6xxx series aluminum alloy with a relatively high Mg content, for example from about 1.0 wt. % to about 1.6 wt. % Mg, and about 0.2 wt. % to about 0.5 wt. % Si. Without being bound by theory, it is believed that using the described Mg amounts can lead to an increase in Si solubility. Thus, by also adjusting the Si concentrations, the insoluble phases are avoided and the age hardening potential of the alloys can be increased. Again, without being bound by theory, the Mg concentrations can provide solution hardening, while the Si concentrations can provide precipitation hardening.

In some aspects, the aluminum alloy can comprise Mg in an amount up to about 1.6 wt. %. In terms of ranges, the aluminum alloy can comprise from about 0.50 wt. % to about 1.6 wt. % Mg. In some aspects, the aluminum alloy can comprise at least about 0.20 wt. % Si. For example, the aluminum alloy can comprise from about 0.20 wt. % to about 0.50 wt. % Si.

Thus, in some aspects, the aluminum alloy can comprise from about 0.50 wt. % to about 1.6 wt. % Mg, and from about 0.20 wt. % to about 0.50 wt. % Si. In some aspects, the ratio of Mg wt. % to wt. % Si in the aluminum alloy can be from about 10:1 to about 1:1 (e.g., about 10:1 to about 1.5:1; about 10:1 to about 2:1; about 9:1 to about 2:1; about 7:1 to about 2:1; about 5:1 to about 2:1; about 4:1 to about 2:1; or about 3:1 to about 2:1).

Unexpectedly, the aluminum alloys described herein exhibit both high formability and age hardening. The aluminum alloys described herein also demonstrate good tensile properties, bendability, and deep-drawability.

The high formability can be measured, for example, by measuring total elongation or uniform elongation. ISO/EN A80 is one appropriate standard that can be used for testing the total elongation (EN 10002 parts 1-5, (2001)). ISO/EN Ag is one appropriate standard that can be used for testing the uniform elongation. For example, the aluminum alloys as described can have a total elongation (A80) in any direction or all directions (longitudinal (L), diagonal (D), and/or transverse (T)) of at least about 20% (e.g., from about 20% to about 40%). In some examples, the aluminum alloys as described can have a uniform elongation (Ag) in any direction or all directions (longitudinal (L), diagonal (D), and/or transverse (T)) of at least about 18% (e.g., from about 18% to about 30%).

Another way to measure formability is the r value (also known as the Lankford coefficient), the plastic strain ratio during a tensile test. The r value is a measurement of the deep-drawability of a sheet metal (i.e., the resistance of a material to thinning or thickening when put into tension or compression). The r value can be measured according to ISO 10113 (2006) or according to ASTM E517 (2019), for example. The r value measured over a strain range from 10% to 15% is indicated as r (10-15). For instance, the aluminum alloys as described can have an r (10-15) value in any direction or all directions (longitudinal (L), diagonal (D), and/or transverse (T)) of at least about 0.45 (e.g., from about 0.45 to about 0.80).

The n value, or the strain hardening exponent, gives an indication of how much the material hardens or becomes stronger when plastically deformed. The n value can be measured using ISO 10275 (2007) or according to ASTM E646 (2016), for example. The n value measured over a strain range from 10% to 20% is indicated as n (10-20). For instance, the aluminum alloys as described can have an n (10-20) value in any individual direction or in all directions (longitudinal (L), diagonal (D), and/or transverse (T)) of at least about 0.20 (e.g., from about 0.20 to about 0.30).

Age hardening can be tested by measuring the bake hardening value in MPa, for example. For example, the aluminum alloys as described can have a bake hardening value from about 70 MPa to about 140 MPa.

Bending can be determined by measuring the f-factor. For example, the aluminum alloys as described can have an f-factor at 10% elongation of less than about 0.85 (e.g., from about 0.30 to about 0.80).

Surprisingly, the aluminum alloys as described herein are age-hardenable while still exhibiting high formability, including deep-drawability and bendability. For example, the aluminum alloys described herein can, in some aspects, have yield strengths (Rp0.2) after bake hardening of up to about 230 MPa (e.g., from about 150 MPa to about 210 MPa).

Provided herein are materials, such as aluminum alloy products, comprising the aluminum alloys described herein. Also provided are materials comprising the core aluminum alloy layers described herein. For example, the core aluminum alloy layers can be combined with at least one clad layer and used in clad aluminum alloy products. The aluminum alloys can also serve as the clad layer in clad aluminum alloy products. The aluminum alloy products or the clad aluminum alloy products can include automotive products (e.g., automotive structural parts), aerospace products (e.g., an aerospace structural part or an aerospace non-structural part), marine products (e.g., a marine structural part or a marine non-structural part), or electronic products (e.g., electronic device housings), among others. Further provided are aluminum alloy sheets, plates, and shates comprising an aluminum alloy product or a clad aluminum alloy product as described herein.

Definitions and Descriptions

As used herein, the terms "invention," "the invention," "this invention," and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as "series" or "5xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, a plate generally has a thickness of greater than about 15 mm. For example, a plate may refer to an aluminum product having a thickness of greater than 15 mm, greater than 20 mm, greater than 25 mm, greater than 30 mm, greater than 35 mm, greater than 40 mm, greater than 45 mm, greater than 50 mm, or greater than 100 mm.

As used herein, a shate (also referred to as a sheet plate) generally has a thickness of from about 4 mm to about 15 mm. For example, a shate may have a thickness of 4 mm, 5 mm, 6 mm, 7 mm, 8 mm, 9 mm, 10 mm, 11 mm, 12 mm, 13 mm, 14 mm, or 15 mm.

As used herein, a sheet generally refers to an aluminum product having a thickness of less than about 4 mm. For example, a sheet may have a thickness of less than 4 mm, less than 3 mm, less than 2 mm, less than 1 mm, less than 0.5 mm, less than 0.3 mm, or less than 0.1 mm.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. A W condition or temper refers to an aluminum alloy solution heat treated at a temperature greater than a solvus temperature of the aluminum alloy and then quenched. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include HX1, HX2, HX3 HX4, HX5, HX6, HX7, HX8, or HX9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked.

As used herein, terms such as "cast metal product," "cast product," "cast aluminum alloy product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. The term "about" includes the exact value.

As used herein, the meaning of "a," "an," and "the" includes singular and plural references unless the context clearly dictates otherwise.

As used herein, "clad layer," "cladding layer," or "clad aluminum alloy layer" refers to a material that is or will be used as a cladding on a core layer. A "core layer" or "core aluminum alloy layer" refers to the inner material that can be the major component in a clad product (e.g., at least 50% or more of the clad product). A "clad product" or "clad aluminum alloy product" refers to the combination of at least one clad layer on a core layer.

As used herein, used beverage cans (UBC) refers to any used beverage can scrap known in the art, for example those described in the Scrap Specifications Circular (2018) published by the Institute of Scrap Recycling Industries, Inc., including shredded aluminum UBC scrap, densified aluminum UBC scrap, baled aluminum UBC scrap, and/or briquetted aluminum UBC scrap.

Throughout the application, the aluminum alloys and aluminum alloy products and their components are described in terms of their elemental composition in weight percent (wt. %). In some aspects, the remainder for the alloy is aluminum, with a maximum wt. % of 0.50% for the sum of all impurities (e.g., a maximum of 0.45 wt. %, a maximum of 0.40 wt. %, a maximum of 0.35 wt. %, a maximum of 0.30 wt. %, a maximum of 0.25 wt. %, a maximum of 0.20 wt. %, a maximum of 0.15 wt. %, and/or a maximum of 0.10 wt. %).

New Aluminum Alloys

The aluminum alloys as described herein are aluminum alloys comprising Mg and Si. The aluminum alloys can further optionally comprise Fe, Cu, Mn, Cr, Zn, Ti, other elements (e.g., impurities) and combinations thereof.

In some aspects, the aluminum alloy can comprise up to about 1.60 wt. % Mg, e.g., up to about 1.58 wt. % Mg, up to about 1.56 wt. % Mg, up to about 1.54 wt. % Mg, up to about 1.52 wt. % Mg, up to about 1.50 wt. % Mg, up to about 1.48 wt. % Mg, up to about 1.46 wt. % Mg, up to about 1.45 wt. % Mg, up to about 1.43 wt. % Mg, up to about 1.42 wt. % Mg, up to about 1.40 wt. % Mg, up to about 1.38 wt. % Mg, up to about 1.37 wt. % Mg, up to about 1.35 wt. % Mg, up to about 1.33 wt. % Mg, up to about 1.32 wt. % Mg, up to about 1.30 wt. % Mg, up to about 1.28 wt. % Mg, up to about 1.27 wt. % Mg, up to about 1.25 wt. % Mg, up to about 1.23 wt. % Mg, up to about 1.22 wt. % Mg, up to about 1.20 wt. % Mg, up to about 1.18 wt. % Mg, up to about 1.17 wt. % Mg, up to about 1.15 wt. % Mg, up to about 1.13 wt. % Mg, up to about 1.12 wt. % Mg, up to about 1.10 wt. % Mg, up to about 1.08 wt. % Mg, up to about 1.07 wt. % Mg, up to about 1.05 wt. % Mg, up to about 1.03 wt. % Mg, up to about 1.02 wt. % Mg, up to about 1.00 wt. % Mg, up to about 0.95 wt. % Mg, up to about 0.90 wt. % Mg, up to about 0.85 wt. % Mg, up to about 0.80 wt. % Mg, up to about 0.75 wt. % Mg, up to about 0.70 wt. % Mg, up to about 0.65 wt. % Mg, up to about 0.60 wt. % Mg, up to about 0.55 wt. % Mg, or up to about 0.50 wt. % Mg. In terms of ranges, the aluminum alloy can comprise from about 0.50 wt. % to about 1.60 wt. % Mg, e.g., from about 0.60 wt. % to about 1.55 wt. % Mg, from about 0.70 wt. % to about 1.52 wt. % Mg, from about 0.80 wt. % to about 1.50 wt. % Mg, from about 0.90 wt. % to about 1.50 wt. % Mg, from about 1.00 wt. % to about 1.50 wt. % Mg, from about 1.10 wt. % to about 1.50 wt. % Mg, from about 1.20 wt. % to about 1.50 wt. % Mg, or from about 1.30 wt. % to about 1.50 wt. % Mg.

In some aspects, the aluminum alloy can comprise up to about 0.50 wt. % Si, e.g., up to about 0.49 wt. % Si, up to about 0.48 wt. % Si, up to about 0.47 wt. % Si, up to about 0.46 wt. % Si, up to about 0.45 wt. % Si, up to about 0.44 wt. % Si, up to about 0.43 wt. % Si, up to about 0.42 wt. % Si, up to about 0.41 wt. % Si, up to about 0.40 wt. % Si, up to about 0.39 wt. % Si, up to about 0.38 wt. % Si, up to about 0.37 wt. % Si, up to about 0.36 wt. % Si, up to about 0.35 wt. % Si, up to about 0.34 wt. % Si, up to about 0.33 wt. % Si, up to about 0.32 wt. % Si, up to about 0.31 wt. % Si, up to about 0.30 wt. % Si, up to about 0.29 wt. % Si, up to about 0.28 wt. % Si, up to about 0.27 wt. % Si, up to about 0.26 wt. % Si, up to about 0.25 wt. % Si, up to about 0.24 wt. % Si, up to about 0.23 wt. % Si, up to about 0.22 wt. % Si, up to about 0.21 wt. % Si, up to about 0.20 wt. % Si, up to about 0.19 wt. % Si, up to about 0.18 wt. % Si, up to about 0.17 wt. % Si, up to about 0.16 wt. % Si, or up to about 0.15 wt. % Si.

In some aspects, the aluminum alloy can comprise at least about 0.15 wt. % Si, at least about 0.16 wt. % Si, at least about 0.17 wt. % Si, at least about 0.18 wt. % Si, at least about 0.19 wt. % Si, at least about 0.20 wt. % Si, at least about 0.21 wt. % Si, at least about 0.22 wt. % Si, at least about 0.23 wt. % Si, at least about 0.24 wt. % Si, at least about 0.25 wt. % Si, at least about 0.26 wt. % Si, at least about 0.27 wt. % Si, at least about 0.28 wt. % Si, at least about 0.29 wt. % Si, at least about 0.30 wt. % Si, at least about 0.31 wt. % Si, at least about 0.32 wt. % Si, at least about 0.33 wt. % Si, at least about 0.34 wt. % Si, at least about 0.35 wt. % Si, at least about 0.36 wt. % Si, at least about 0.37 wt. % Si, at least about 0.38 wt. % Si, at least about 0.39 wt. % Si, at least about 0.40 wt. % Si, at least about 0.41 wt. % Si, at least about 0.42 wt. % Si, at least about 0.43 wt. % Si, at least about 0.44 wt. % Si, at least about 0.45 wt. % Si, at least about 0.46 wt. % Si, at least about 0.47 wt. % Si, at least about 0.48 wt. % Si, at least about 0.49 wt. % Si, or at least about 0.50 wt. % Si.

In terms of ranges, the aluminum alloy can comprise from about 0.15 wt. % to about 0.5 wt. % Si, e.g., from about 0.20 wt. % to about 0.45 wt. % Si, from about 0.22 wt. % to about 0.43 wt. % Si, from about 0.25 wt. % to about 0.41 wt. % Si, from about 0.26 wt. % to about 0.40 wt. % Si, from about 0.28 wt. % to about 0.40 wt. % Si, from about 0.30 wt. % to about 0.40 wt. % Si, from about 0.31 wt. % to about 0.39 wt. % Si, from about 0.32 wt. % to about 0.38 wt. % Si, from about 0.33 wt. % to about 0.38 wt. % Si, from about 0.34 wt. % to about 0.38 wt. % Si, or from about 0.34 wt. % to about 0.37 wt. % Si.

Thus, in some aspects, the aluminum alloy can comprise from about 0.50 wt. % to about 1.5 wt. % Mg and from about 0.15 wt. % to about 0.50 wt. % Si. In some aspects, the ratio of Mg wt. % to wt. % Si in the aluminum alloy can be from about 10:1 to about 1:1 (e.g., about 10:1 to about 1.5:1; about 10:1 to about 2:1; about 9:1 to about 1.5:1; about 9:1 to about 2:1; about 8:1 to about 1.5:1; about 8:1 to about 2:1; about 7:1 to about 2:1; about 5:1 to about 2:1; about 4:1 to about 2:1; or about 3:1 to about 2:1).

The aluminum alloy can optionally comprise up to about 1.0 wt. % iron (Fe), e.g., up to about 0.95 wt. % Fe, up to about 0.90 wt. % Fe, up to about 0.85 wt. % Fe, up to about 0.80 wt. % Fe, up to about 0.75 wt. % Fe, up to about 0.70 wt. % Fe, up to about 0.65 wt. % Fe, up to about 0.60 wt. % Fe, up to about 0.55 wt. % Fe, up to about 0.50 wt. % Fe, up to about 0.45 wt. % Fe, up to about 0.40 wt. % Fe, up to about 0.35 wt. % Fe, up to about 0.30 wt. % Fe, up to about 0.25 wt. % Fe, up to about 0.20 wt. % Fe, up to about 0.15 wt. % Fe, up to about 0.10 wt. % Fe, up to about 0.08 wt. % Fe, up to about 0.05 wt. % Fe, up to about 0.03 wt. % Fe, or up to about 0.01 wt. % Fe. In terms of ranges, the aluminum alloy can optionally comprise from about 0.01 wt. % to about 1.0 wt. % Fe, e.g., from about 0.03 wt. % to about 0.90 wt. % Fe, from about 0.05 wt. % to about 0.80 wt. % Fe, from about 0.08 wt. % to about 0.80 wt. % Fe, from about 0.08 wt. % to about 0.75 wt. % Fe, from about 0.01 wt. % to about 0.70 wt. % Fe, from about 0.20 wt. % to about 0.60 wt. % Fe, from about 0.20 wt. % to about 0.55 wt. % Fe, from about 0.25 wt. % to about 0.55 wt. % Fe, from about 0.25 wt. % to about 0.50 wt. % Fe, or from about 0.30 wt. % to about 0.50 wt. % Fe.

The aluminum alloy can optionally comprise copper (Cu). In some aspects, the aluminum alloy can comprise up to about 0.5 wt. % Cu, e.g., up to about 0.45 wt. % Cu, up to about 0.40 wt. % Cu, up to about 0.35 wt. % Cu, up to about 0.30 wt. % Cu, up to about 0.25 wt. % Cu, up to about 0.20 wt. % Cu, up to about 0.15 wt. % Cu, up to about 0.10 wt. % Cu, up to about 0.05 wt. % Cu, up to about 0.04 wt. % Cu, up to about 0.03 wt. % Cu, up to about 0.02 wt. % Cu, or up to about 0.01 wt. % Cu. In terms of ranges, the aluminum alloy can optionally comprise from about 0.01 wt. % to about 0.5 wt. % Cu, e.g., from about 0.03 wt. % to about 0.40 wt. % Cu, from about 0.03 wt. % to about 0.30 wt. % Cu, from about 0.03 wt. % to about 0.10 wt. % Cu, from about 0.04 wt. % to about 0.08 wt. % Cu, or from about 0.04 wt. % to about 0.06 wt. % Cu.

The aluminum alloy can optionally comprise manganese (Mn). In some aspects, the aluminum alloy can comprise up to about 0.5 wt. % Mn, e.g., up to about 0.45 wt. % Mn, up to about 0.40 wt. % Mn, up to about 0.35 wt. % Mn, up to about 0.30 wt. % Mn, up to about 0.25 wt. % Mn, up to about 0.20 wt. % Mn, up to about 0.15 wt. % Mn, up to about 0.10 wt. % Mn, up to about 0.05 wt. % Mn, up to about 0.04 wt. % Mn, up to about 0.03 wt. % Mn, up to about 0.02 wt. % Mn, or up to about 0.01 wt. % Mn. In terms of ranges, the aluminum alloy can optionally comprise from about 0.01 wt. % to about 0.5 wt. % Mn, e.g., from about 0.03 wt. % to about 0.40 wt. % Mn, from about 0.03 wt. % to about 0.30 wt. % Mn, from about 0.03 wt. % to about 0.25 wt. % Mn, from about 0.04 wt. % to about 0.20 wt. % Mn, or from about 0.10 wt. % to about 0.20 wt. % Mn.

The aluminum alloy can optionally comprise chromium (Cr). In some aspects, the aluminum alloy can comprise up to about 0.3 wt. % Cr, e.g., up to about 0.25 wt. % Cr, up to about 0.20 wt. % Cr, up to about 0.15 wt. % Cr, up to about 0.10 wt. % Cr, up to about 0.08 wt. % Cr, up to about 0.05 wt. % Cr, up to about 0.03 wt. % Cr, up to about 0.02 wt. % Cr, up to about 0.01 wt. % Cr, or up to about 0.008 wt. % Cr. In terms of ranges, the aluminum alloy can optionally comprise from about 0.005 wt. % to about 0.30 wt. % Cr, e.g., from about 0.008 wt. % to about 0.30 wt. % Cr, from about 0.01 wt. % to about 0.30 wt. % Cr, from about 0.03 wt. % to about 0.25 wt. % Cr, from about 0.05 wt. % to about 0.25 wt. % Cr, from about 0.06 wt. % to about 0.20 wt. % Cr, or from about 0.08 wt. % to about 0.15 wt. % Cr.

The aluminum alloy can optionally comprise titanium (Ti). In some aspects, the aluminum alloy can comprise up to about 0.3 wt. % Ti, e.g., up to about 0.25 wt. % Ti, up to about 0.20 wt. % Ti, up to about 0.15 wt. % Ti, up to about 0.10 wt. % Ti, up to about 0.08 wt. % Ti, up to about 0.05 wt. % Ti, up to about 0.03 wt. % Ti, up to about 0.02 wt. % Ti, up to about 0.01 wt. % Ti, or up to about 0.008 wt. % Ti. In terms of ranges, the aluminum alloy can optionally comprise from about 0.005 wt. % to about 0.30 wt. % Ti, e.g., from about 0.008 wt. % to about 0.30 wt. % Ti, from about 0.01 wt. % to about 0.30 wt. % Ti, from about 0.03 wt. % to about 0.25 wt. % Ti, from about 0.05 wt. % to about 0.25 wt. % Ti, from about 0.06 wt. % to about 0.20 wt. % Ti, or from about 0.08 wt. % to about 0.15 wt. % Ti.

The aluminum alloy can optionally comprise zinc (Zn). In some aspects, the aluminum alloy can comprise up to about 0.5 wt. % Zn, e.g., up to about 0.45 wt. % Zn, up to about 0.40 wt. % Zn, up to about 0.35 wt. % Zn, up to about 0.30 wt. % Zn, up to about 0.25 wt. % Zn, up to about 0.20 wt. % Zn, up to about 0.15 wt. % Zn, up to about 0.10 wt. % Zn, up to about 0.08 wt. % Zn, up to about 0.05 wt. % Zn, up to about 0.03 wt. % Zn, up to about 0.02 wt. % Zn, up to about 0.01 wt. % Zn, or up to about 0.008 wt. % Zn. In terms of ranges, the aluminum alloy can optionally comprise from about 0.005 wt. % to about 0.50 wt. % Zn, e.g., from about 0.008 wt. % to about 0.30 wt. % Zn, from about 0.01 wt. % to about 0.30 wt. % Zn, from about 0.03 wt. % to about 0.25 wt. % Zn, from about 0.05 wt. % to about 0.25 wt. % Zn, from about 0.06 wt. % to about 0.20 wt. % Zn, or from about 0.08 wt. % to about 0.15 wt. % Zn.

Optionally, the aluminum alloy described herein can further include other minor elements, sometimes referred to as impurities, in amounts of about 0.05 wt. % or below, about 0.04 wt. % or below, about 0.03 wt. % or below, about 0.02 wt. % or below, or about 0.01 wt. % or below. These impurities may include, but are not limited to, V, Ni, Sc, Hf, Zr, Sn, Ga, Bi, Na, Pb, or combinations thereof. Accordingly, V, Ni, Sc, Hf, Zr, Sn, Ga, Bi, Na, or Pb, may each be present in the alloys in amounts of about 0.05 wt. % or below, about 0.04 wt. % or below, about 0.03 wt. % or below, about 0.02 wt. % or below, or about 0.01 wt. % or below, for example. The sum of all impurities does not exceed about 0.50 wt. % (e.g., does not exceed about 0.40 wt. %, about 0.30 wt. %, about 0.25 wt. %, about 0.20 wt. % about 0.15 wt. %, or about 0.10 wt. %). All expressed in wt. %. In some aspects, the remaining percentage of the alloy is aluminum.

Optionally, the aluminum alloy can comprise recycled aluminum or aluminum alloys. For example, the aluminum alloy can comprise recycled 5xxx series aluminum alloy scrap. As another example, the aluminum alloy can comprise recycled 6xxx series aluminum alloy scrap or both 5xxx series aluminum alloy scrap and 6xxx series aluminum alloy scrap. Recycled aluminum content, recycled aluminum, or recycled aluminum scrap as used herein refers to any aluminum and/or aluminum alloy that is reused or recovered from a prior use. Recycled aluminum content can include, but is broader than used beverage cans content. In some aspects, the aluminum alloy can contain at least about 10 wt. % recycled content (e.g., at least about 15 wt. % recycled content, at least about 20 wt. % recycled content, at least about 25 wt. % recycled content, at least about 30 wt. % recycled content, at least about 35 wt. % recycled content, at least about 40 wt. % recycled content, at least about 45 wt. % recycled content, at least about 50 wt. % recycled content, at least about 55 wt. % recycled content, or at least about 60 wt. % recycled content). In some aspects, the aluminum alloy can contain at least about 5% used beverage cans ("UBC") (e.g., at least about 8 wt. % UBC, at least about 10 wt. % UBC, at least about 15 wt. % UBC, at least about 20 wt. % UBC, at least about 25 wt. % UBC, at least about 30 wt. % UBC, at least about 35 wt. % UBC, at least about 40 wt. % UBC, at least about 45 wt. % UBC, at least about 50 wt. % UBC, at least about 55 wt. % UBC, or at least about 60 wt. % UBC) UBC scrap as used herein is collected metal from used beverage cans and similar products that can be recycled for use in further metal products. Aluminum UBC scrap is often a mixture of various aluminum alloys (e.g., from different alloys used for can bodies and can ends) and can often include foreign substances, such as rainwater, drink remainders, organic matter (e.g., paints and laminated films), and other materials. UBC scrap generally contains a mixture of metal from various alloys, such as metal from can bodies (e.g., 3104, 3004, or other 3xxx aluminum alloy) and can ends (e.g., 5182 or other 5xxx aluminum alloy). UBC scrap can be shredded and decoated or delacquered prior to being melted for use as liquid metal stock in casting a new metal product.

In some aspects, the aluminum alloy can comprise a combined concentration of Fe, Cu, and Mn of greater than about 0.5 wt. %, (e.g., greater than about 0.6 wt. %, greater than about 0.7 wt. %, greater than about 0.8 wt. %, greater than about 0.9 wt. %, greater than about 1.0 wt. %, greater than about 1.2 wt. %, greater than about 1.5 wt. %, greater than about 1.7 wt. %, greater than about 2.0 wt. %, greater than about 2.2 wt. %, greater than about 2.5 wt. %, greater than about 2.7 wt. %, greater than about 3.0 wt. %, from about 0.5 wt. % to about 3.0 wt. %, from about 0.5 wt. % to about 2.8 wt. %, from about 0.6 wt. % to about 2.5 wt. %, from about 0.7 wt. % to about 2.5 wt. %, from about 0.7 wt. % to about 2.2 wt. %, from about 0.9 wt. % to about 3.0 wt. %, or from about 1.0 wt. % to about 2.0 wt. %). As indicated, in other aspects, Fe, Cu, and Mn are not present or may be present at lower levels.

The aluminum alloys as described herein can have an average grain diameter of from about 5 μm to about 50 μm (e.g., from about 8 μm to about 40 μm, from about 10 μm to about 30 μm, or from about 15 μm to about 25 μm), for example. In some aspects, the grain sizes of the aluminum alloys described are suitable for skin applications.

Properties of New Aluminum Alloys

The aluminum alloys described herein surprisingly exhibit both high formability and age hardening. The aluminum alloys described herein also demonstrate good tensile properties, bendability, and deep-drawability.

For example, the aluminum alloys described herein can, in some aspects, have yield strengths (Rp0.2) after bake hardening (e.g., after a paint bake cycle of 20 minutes at 185° C. to a T8x temper) of up to about 250 MPa (e.g., from about 80 MPa to about 240 MPa, from about 150 MPa to about 230 MPa, from about 160 MPa to about 230 MPa, from about 165 MPa to about 220 MPa, or from about 170 MPa to about 210 MPa). Rp0.2 refers to the amount of stress that will result in a plastic strain of 0.2%. In some examples, the yield strengths (Rp0.2) of the aluminum alloys can be about 100 MPa, about 110 MPa, about 120 MPa, about 130 MPa, about 140 MPa, about 150 MPa, about 160 MPa, about 170 MPa, about 180 MPa, about 190 MPa, about 200 MPa, about 210 MPa, about 220 MPa, about 230 MPa, or about 240 MPa. Further, in some aspects, the aluminum alloys described herein can have an ultimate tensile strength (Rm)

after bake hardening (e.g., after a paint bake cycle of 20 minutes at 185° C. to a T8x temper) of up to about 300 MPa (e.g., from about 230 MPa to about 300 MPa, from about 240 MPa to about 300 MPa, or from about 240 MPa to about 290 MPa). Rm refers to the ultimate tensile strength. Thus in some examples, the Rm of the aluminum alloys can be about 230 MPa, about 240 MPa, about 250 MPa, about 260 MPa, about 270 MPa, about 280 MPa, about 290 MPa, or about 300 MPa.

In some aspects, the aluminum alloys as described herein can have a yield strength (Rp0.2) before bake hardening (T4 temper) of from about 80 MPa to about 140 MPa (e.g., from about 80 MPa to about 130 MPa, from about 80 MPa to about 120 MPa, or from about 85 MPa to about 110 MPa). Further, the aluminum alloys as described herein can have an Rm before bake hardening (T4 temper) of from about 170 MPa to about 280 MPa (e.g., from about 180 MPa to about 270 MPa, from about 170 MPa to about 250 MPa, from about 190 MPa to about 230 MPa, or from about 190 MPa to about 220 MPa).

While being age-hardenable, surprisingly, the aluminum alloys as described herein still exhibit high formability, including deep-drawability and bendability.

For example, the aluminum alloys as described herein can have a total elongation (as measured by ISO/EN A80) in any individual direction or in all directions (longitudinal (L), diagonal (D), and/or transverse (T)) of at least about 20% (e.g., at least about 21%, at least about 22%, at least about 23%, at least about 24%, at least about 25%, at least about 26%, at least about 27%, at least about 28%, at least about 29%, at least about 30%, at least about 31%, at least about 32%, at least about 33%, at least about 34%, at least about 35%, at least about 36%, at least about 37%, at least about 38%, at least about 39%, or at least about 40%). In terms of ranges, the aluminum alloys can have an elongation of from about 20% to about 40% (e.g., from about 22% to about 38%, from about 23% to about 36%, from about 24% to about 34%, from about 25% to about 33%, from about 25% to about 32%, from about 25% to about 31%, from about 25% to about 30%, or from about 25% to about 29%).

In some aspects, the aluminum alloys as described herein can have a uniform elongation (Ag) (as measured by ISO/EN Ag) in any individual direction or in all directions (longitudinal (L), diagonal (D), and/or transverse (T)) of at least about 18% (e.g., at least about 19%, at least about 20%, at least about 21%, at least about 22%, at least about 23%, at least about 24%, at least about 25%, at least about 26%, at least about 27%, at least about 28%, at least about 29%, or at least about 30%). In terms of ranges, the aluminum alloys can have an elongation of from about 18% to about 30% (e.g., from about 22% to about 38%, from about 23% to about 36%, from about 24% to about 34%, from about 25% to about 33%, from about 25% to about 32%, from about 25% to about 31%, from about 25% to about 30%, or from about 25% to about 29%).

In some aspects, the aluminum alloys as described can have an r (10-15) value in any individual direction or in all directions (longitudinal (L), diagonal (D), and/or transverse (T)) of at least about 0.45 (e.g., of at least about 0.46, of at least about 0.47, of at least about 0.48, of at least about 0.49, of at least about 0.50, of at least about 0.51, of at least about 0.52, of at least about 0.53, of at least about 0.54, of at least about 0.55, of at least about 0.56, of at least about 0.57, of at least about 0.58, of at least about 0.59, of at least about 0.60, of at least about 0.61, of at least about 0.62, of at least about 0.63, of at least about 0.64, of at least about 0.65, of at least about 0.66, of at least about 0.67, of at least about 0.68, of at least about 0.69, of at least about 0.70, of at least about 0.71, of at least about 0.72, of at least about 0.73, of at least about 0.74, of at least about 0.75, of at least about 0.76, of at least about 0.77, of at least about 0.78, of at least about 0.79, or of at least about 0.80). In terms of ranges, the aluminum alloy can have an r (10-15) value in any direction or all directions (longitudinal (L), diagonal (D), and/or transverse (T)) of from about 0.45 to about 0.80 (e.g., from about 0.45 to about 0.75, from about 0.47 to about 0.72, from about 0.50 to about 0.70, or from about 0.52 to about 0.68).

In some aspects, the aluminum alloys as described can have an n (10-20) value in any direction or all directions (longitudinal (L), diagonal (D), and/or transverse (T)) of at least about 0.20 (e.g., of at least about 0.21, of at least about 0.22, of at least about 0.23, of at least about 0.24, of at least about 0.25, of at least about 0.26, of at least about 0.27, of at least about 0.28, of at least about 0.29, or of at least about 0.30). In terms of ranges, the aluminum alloy can have an n (10-20) value in any individual direction or in all directions (longitudinal (L), diagonal (D), and/or transverse (T)) of from about 0.20 to about 0.30 (e.g., of from about 0.21 to about 0.29 or of from about 0.22 to about 0.28).

Further, the aluminum alloys described herein can have strong bendability properties. In some aspects, the aluminum alloys as described can have a minimum R/t ratio or f-factor at 10% elongation of about 0.60 or less, for example. As described, the bendability is assessed based on the R/t ratio, where R is the radius of the tool (die) used and t is the thickness of the material. A lower R/t ratio indicates better bendability of the material.

More specifically, the aluminum alloys as described can have an f-factor at 10% elongation of less than about 0.85 (e.g., less than about 0.80, less than about 0.75, less than about 0.70, less than about 0.65, less than about 0.60, less than about 0.59, less than about 0.58, less than about 0.57, less than about 0.56, less than about 0.55, less than about 0.54, less than about 0.53, less than about 0.52, less than about 0.51, less than about 0.50, less than about 0.49, less than about 0.48, less than about 0.47, less than about 0.46, less than about 0.45, less than about 0.44, less than about 0.43, less than about 0.42, less than about 0.41, less than about 0.40, less than about 0.39, less than about 0.38, less than about 0.37, less than about 0.36, less than about 0.35, less than about 0.34, less than about 0.33, less than about 0.32, less than about 0.31, or less than about 0.30). In terms of ranges, the aluminum alloys can have an f-factor at 10% elongation of from about 0.30 to about 0.85 (e.g., from about 0.30 to 0.80, from about 0.30 to about 0.75, from about 0.30 to about 0.70, from about 0.30 to about 0.65, from about 0.35 to about 0.58, from about 0.35 to about 0.55, from about 0.35 to about 0.50, from about 0.35 to about 0.45, or from about 0.37 to about 0.45).

Clad Products

In addition to monolithic aluminum alloy products, in some aspects, the aluminum alloys described here can be used in clad aluminum alloy products. The clad aluminum alloy products can comprise the aluminum alloys described as a core layer. In addition, one or more clad layers can be in contact with the core layer. In some aspects, the aluminum alloys described can serve as a clad layer. In some examples, the core aluminum alloy layer has a clad layer on only one side (i.e., one clad layer is present in the clad aluminum alloy product). In other examples, the core aluminum alloy layer is cladded on more than one side, for example both sides (i.e., two clad layers are present in the clad aluminum alloy product). Typically, the core layer is the larger component of the material, and therefore usually predominately determines the bulk mechanical properties of the clad product, for example the strength of the clad product. On the other hand, the clad layer(s), which typically (but not always) represent a smaller component of the clad product, are in contact with the surrounding environment and thus determine the chemical activity (e.g., corrosion resistance) and can affect the formability and joining properties of the clad product.

In some aspects, a first side of the core aluminum alloy layer is adjacent to and contacts a first clad layer to form a first interface. In other words, no layers intervene between the first clad layer and the first side of the core layer. In some aspects, the clad aluminum alloy product includes a second clad layer. In some instances, a second side of the core layer is adjacent to and contacts the second clad layer to form a second interface (i.e., no layers intervene between the second clad layer and the second side of the core layer). In some aspects, the first clad layer and the second clad layer can be the same chemical composition. In other aspects, the first clad layer and the second clad layer can be different chemical compositions.

In some aspects, the thickness of the clad products can be from about 0.1 mm to about 6 mm, (e.g., about 0.1 mm to about 5.8 mm, from about 0.2 mm to about 5.5 mm, from about 0.3 mm to about 5.3 mm, from about 0.4 mm to about 5.2 mm, from about 0.5 mm to about 5.0 mm, from about 0.6 mm to about 4.8 mm, from about 0.7 mm to about 4.6 mm, from about 0.8 mm to about 4.5 mm, from about 0.8 mm to about 4.3 mm, from about 0.9 mm to about 4.2 mm, from about 1 mm to about 4 mm, from about 1.3 mm to about 3.8 mm, from about 1.5 mm to about 3.5 mm, from about 1.7 mm to about 3.2 mm, or from about 2 mm to about 3 mm).

Core Layer

As noted, the core layer can comprise the aluminum alloys described above. For example, the core layer can comprise an aluminum alloy comprising Mg in an amount from about 0.50 wt. % to about 1.6 wt. % and Si in an amount from about 0.2 wt. % to about 0.5 wt. %.

The thickness of the core layer can be from about 30% to about 99% of the thickness of the clad aluminum alloy products described herein, e.g., from about 40% to 99%, from about 50% to 99%, from about 55% to 99%, from about 60% to 98%, from about 70% to 98%, from about 75% to 95%, or from about 80% to 90%. For example, in a clad aluminum alloy product having a thickness of about 1000 microns, the core layer can have a thickness of about 300 microns to about 990 microns. Optionally, the core layer can have a thickness in the range of about 0.1 mm to about 5 mm (e.g., about 0.5 mm to about 3 mm, from about 0.7 mm to about 2.5 mm, or about 0.8 mm to about 2 mm). For example, the thickness of the core layer can be about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, or about 3.0 mm.

Clad Layer(s)

The clad layer(s) of the clad aluminum alloy products can comprise an aluminum alloy. In some aspects, the aluminum alloys described herein can serve as the clad layers(s). In some examples, any alloy designated as a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, or an 8xxx series aluminum alloy is suitable for use as the clad layer.

By way of non-limiting example, exemplary 1xxx series aluminum alloys for use as a clad layer can include AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, and AA1199.

Non-limiting exemplary 2xxx series aluminum alloys for use as a clad layer can include AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, and AA2199.

Non-limiting exemplary 3xxx series aluminum alloys for use as a clad layer can include AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, and AA3065.

Non-limiting exemplary 4xxx series aluminum alloys for use as a clad layer can include AA4045, AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4145, AA4145A, AA4046, AA4047, AA4047A, and AA4147.

Non-limiting exemplary 5xxx series aluminum alloys for use as a clad layer can include AA5182, AA5183, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, and AA5088.

Non-limiting exemplary 6xxx series aluminum alloys for use as a clad layer can include AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, and AA6092.

Non-limiting exemplary 7xxx series aluminum alloys for use as a clad layer can include AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7204, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, and AA7099.

Non-limiting exemplary 8xxx series aluminum alloys suitable for use as a clad layer can include AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, and AA8093.

Clad layers as described herein can improve surface corrosion resistance properties of the products, improve pretreatment efficiency, and aid in bending, riveting hole piercing, and clinching.

In some examples, the alloy described herein for use as the clad layer includes zinc (Zn) in an amount of up to about 7.0% (e.g., up to about 1.0%, from about 3.5% to about 6.0%, from about 4.0% to about 5.5%, from about 0.05% to about 0.25%, or from about 0.10% to about 0.45%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, about 0.35%, about 0.36%, about 0.37%, about 0.38%, about 0.39%, about 0.40%, about 0.41%, about 0.42%, about 0.43%, about 0.44%, about 0.45%, about 0.46%, about 0.47%, about 0.48%, about 0.49%, about 0.50%, about 0.51%, about 0.52%, about 0.53%, about 0.54%, about 0.55%, about 0.56%, about 0.57%, about 0.58%, about 0.59%, about 0.60%, about 0.61%, about 0.62%, about 0.63%, about 0.64%, about 0.65%, about 0.66%, about 0.67%, about 0.68%, about 0.69%, about 0.70%, about 0.71%, about 0.72%, about 0.73%, about 0.74%, about 0.75%, about 0.76%, about 0.77%, about 0.78%, about 0.79%, about 0.80%, about 0.81%, about 0.82%, about 0.83%, about 0.84%, about 0.85%, about 0.86%, about 0.87%, about 0.88%, about 0.89%, about 0.90%, about 0.91%, about 0.92%, about 0.93%, about 0.94%, about 0.95%, about 0.96%, about 0.97%, about 0.98%, about 0.99%, about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, about 6.0%, about 6.1%, about 6.2%, about 6.3%, about 6.4%, about 6.5%, about 6.6%, about 6.7%, about 6.8%, about 6.9%, or about 7.0% Zn. In some cases, Zn is not present in the alloy (i.e., 0%). All expressed in wt. %.

In some examples, the alloy described herein for use as the clad layer also includes magnesium (Mg) in an amount of up to about 6.0% (e.g., from about 0.2% to about 5.7%, from about 1.2% to about 3.3%, from about 1.5% to about 2.5%, or from about 4.0% to about 4.8%) based on the total weight of the alloy. For example, the alloy can include about 0.05%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, or about 6.0% Mg. All expressed in wt. %.

In some examples, the alloy described herein for use as the clad layer can also include copper (Cu) in an amount of up to about 0.35% (e.g., from 0% to about 0.30% or from about 0.1% to about 0.25%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, or about 0.35% Cu. In some cases, Cu is not present in the alloy (i.e., 0%). All expressed in wt. %.

In some examples, the alloy described herein for use as the clad layer also includes silicon (Si) in an amount of from about 0.05% to about 13.5% (e.g., from about 0.1% to about 13.0%, from about 0.5% to about 12.5%, from about 1% to about 10%, from about 2% to about 8%, from about 4% to about 7%, from about 0.05% to about 0.40%, from about 0.6% to about 13.5%, from about 0.10% to about 0.35% or from about 0.15% to about 0.30% Si) based on the total weight of the alloy. For example, the alloy can include about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, about 0.35%, about 0.36%, about 0.37%, about 0.38%, about 0.39%, about 0.40%, about 0.41%, about 0.42%, about 0.43%, about 0.44%, about 0.45%, about 0.46%, about 0.47%, about 0.48%, about 0.49%, about 0.50%, about 0.51%, about 0.52%, about 0.53%, about 0.54%, about 0.55%, about 0.56%, about 0.57%, about 0.58%, about 0.59%, about 0.60%, about 0.61%, about 0.62%, about 0.63%, about 0.64%, about 0.65%, about 0.66%, about 0.67%, about 0.68%, about 0.69%, about 0.70%, about 0.71%, about 0.72%, about 0.73%, about 0.74%, about 0.75%, about 0.76%, about 0.77%, about 0.78%, about 0.79%, about 0.80%, about 0.81%, about 0.82%, about 0.83%, about 0.84%, about 0.85%, about 0.86%, about 0.87%, about 0.88%, about 0.89%, about 0.90%, about 0.91%, about 0.92%, about 0.93%, about 0.94%, about 0.95%, about 0.96%, about 0.97%, about 0.98%, about 0.99%, about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, about 6.0%, about 6.1%, about 6.2%, about 6.3%, about 6.4%, about 6.5%, about 6.6%, about 6.7%, about 6.8%, about 6.9%, about 7.0%, about 7.1%, about 7.2%, about 7.3%, about 7.4%, about 7.5%, about 7.6%, about 7.7%, about 7.8%, about 7.9%, about 8.0%, about 8.1%, about 8.2%, about 8.3%, about 8.4%, about 8.5%, about 8.6%, about 8.7%, about 8.8%, about 8.9%, about 9.0%, about 9.1%, about 9.2%, about 9.3%, about 9.4%, about 9.5%, about 9.6%, about 9.7%, about 9.8%, about 9.9%, about 10.0%, about 10.1%, about 10.2%, about 10.3%, about 10.4%, about 10.5%, about 10.6%, about 10.7%, about 10.8%, about 10.9%, about 11.0%, about 11.1%, about 11.2%, about 11.3%, about 11.4%, about 11.5%, about 11.6%, about 11.7%, about 11.8%, about 11.9%, about 12.0%, about 12.1%, about 12.2%, about 12.3%, about 12.4%, about 12.5%, about 12.6%, about 12.7%, about 12.8%, about 12.9%, about 13.0%, about 13.1%, about 13.2%, about 13.3%, about 13.4%, or about 13.5% Si. All expressed in wt. %.

In some examples, the alloy described herein for use as the clad layer also includes iron (Fe) in an amount of from about 0.10% to about 0.90% (e.g., from about 0.20% to about 0.60%, from about 0.20% to about 0.40%, or from about 0.25% to about 0.35%) based on the total weight of the alloy. For example, the alloy can include about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, about 0.35%, about 0.36%, about 0.37%, about 0.38%, about 0.39%, about 0.40%, about 0.41%, about 0.42%, about 0.43%, about 0.44%, about 0.45%, about 0.46%, about 0.47%, about 0.48%, about 0.49%, about 0.50%, about 0.51%, about 0.52%, about 0.53%, about 0.54%, about 0.55%, about 0.56%, about 0.57%, about 0.58%, about 0.59%, about 0.60%, about 0.61%, about 0.62%, about 0.63%, about 0.64%, about 0.65%, about 0.66%, about 0.67%, about 0.68%, about 0.69%, about 0.70%, about 0.71%, about 0.72%, about 0.73%, about 0.74%, about 0.75%, about 0.76%, about 0.77%, about 0.78%, about 0.79%, about 0.80%, about 0.81%, about 0.82%, about 0.83%, about 0.84%, about 0.85%, about 0.86%, about 0.87%, about 0.88%, about 0.89%, or about 0.90% Fe. All expressed in wt. %.

In some examples, the alloy described herein for use as the clad layer can also include manganese (Mn) in an amount of up to about 1.5% (e.g., from about 0.1% to about 0.8%, from about 0.15% to about 0.55%, or from about 0.2% to about 0.35%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, about 0.35%, about 0.36%, about 0.37%, about 0.38%, about 0.39%, about 0.40%, about 0.41%, about 0.42%, about 0.43%, about 0.44%, about 0.45%, about 0.46%, about 0.47%, about 0.48%, about 0.49%, about 0.50%, about 0.51%, about 0.52%, about 0.53%, about 0.54%, about 0.55%, about 0.56%, about 0.57%, about 0.58%, about 0.59%, about 0.60%, about 0.61%, about 0.62%, about 0.63%, about 0.64%, about 0.65%, about 0.66%, about 0.67%, about 0.68%, about 0.69%, about 0.70%, about 0.71%, about 0.72%, about 0.73%, about 0.74%, about 0.75%, about 0.76%, about 0.77%, about 0.78%, about 0.79%, about 0.80%, about 0.81%, about 0.82%, about 0.83%, about 0.84%, about 0.85%, about 0.86%, about 0.87%, about 0.88%, about 0.89%, about 0.90%, about 0.91%, about 0.92%, about 0.93%, about 0.94%, about 0.95%, about 0.96%, about 0.97%, about 0.98%, about 0.99%, about 1.0%, about 1.1%, about 1.2%, about 1.3%, about 1.4%, or about 1.5% Mn. In some cases, Mn is not present in the alloy (i.e., 0%). All expressed in wt. %.

In some examples, the alloy described herein for use as the clad layer can also include chromium (Cr) in an amount of up to about 0.35% (e.g., from 0% to about 0.25% or from about 0.01% to about 0.15%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, or about 0.35% Cr. In some cases, Cr is not present in the alloy (i.e., 0%). All expressed in wt. %.

In some examples, the alloy described herein for use as the clad layer can also include zirconium (Zr) in an amount of up to about 0.30% (e.g., from 0% to about 0.20% or from about 0.05% to about 0.15%) based on the total weight of the alloy. For example, the alloy can include about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, or about 0.30% Zr. In some cases, Zr is not present in the alloy (i.e., 0%). All expressed in wt. %.

Optionally, the alloy described herein can further include other minor elements, sometimes referred to as impurities, in amounts of about 0.05% or below, about 0.04% or below, about 0.03% or below, about 0.02% or below, or about 0.01% or below each, for example. These impurities may include, but are not limited to, V, Ni, Sn, Ga, Ca, Bi, Na, Pb, or combinations thereof. Accordingly, V, Ni, Sn, Ga, Ca, Bi, Na, or Pb may be present in alloys in amounts of about 0.05% or below, about 0.04% or below, about 0.03% or below, about 0.02% or below, or about 0.01% or below. In some aspects, the sum of all impurities does not exceed about 0.15% (e.g., about 0.10%). All expressed in wt. %. The remaining percentage of the alloy is aluminum.

The thickness of each clad layer can be from about 1% to about 25% of the total thickness of the clad aluminum alloy products described herein (e.g., from about 1% to about 12%, or about 10%). For example, in an aluminum alloy product having a thickness of 1000 microns, each clad layer can have a thickness of about 10 microns to about 250 microns. Optionally, each clad layer can have a thickness in the range of about 0.05 mm to about 0.80 mm (e.g., about 0.10 mm to about 0.80 mm, about 0.10 mm to about 0.60 mm, or about 0.20 mm to about 0.50 mm).

As described above, the clad aluminum alloy products can contain one clad layer or more than one clad layer. In some cases, the clad aluminum alloy products contain only a first clad layer. In some cases, the clad aluminum alloy products contain a first clad layer and a second clad layer. In some cases, the first clad layer and the second clad layer are identical in composition. In other cases, the first clad layer and the second clad layer differ in composition. The resulting clad aluminum alloy products exhibit excellent balanced properties, such as strength, formability, corrosion resistance, dent resistance, and hemming performance.

Methods of Producing the Aluminum Alloys, Aluminum Alloy Products, and Clad Aluminum Alloy Products The alloys described herein can be cast using any suitable casting method. As a few non-limiting examples, the casting process can include a direct chill (DC) casting process or a continuous casting (CC) process.

In addition, a clad layer as described herein can be attached to a core layer as described herein to form a clad aluminum alloy product by any means known to persons of ordinary skill in the art. For example, a clad layer can be attached to a core layer by direct chill co-casting (i.e., fusion casting) as described in, for example, U.S. Pat. Nos. 7,748,434 and 8,927,113, both of which are hereby incorporated by reference in their entireties; by hot and cold rolling a composite cast ingot as described in U.S. Pat. No. 7,472,740, which is hereby incorporated by reference in its entirety; or by roll bonding to achieve the required metallurgical bonding between the core and the clad layer; or by other methods as known to persons of ordinary skill in the art. The initial dimensions and final dimensions of the clad aluminum alloy products described herein can be determined by the desired properties of the overall final product.

The roll bonding process can be carried out in different manners. For example, the roll-bonding process can include both hot rolling and cold rolling. Further, the roll bonding process can be a one-step process or a multi-step process in which the material is gauged down during successive rolling steps. Separate rolling steps can optionally be separated by other processing steps, including, for example, annealing steps, cleaning steps, heating steps, cooling steps, and the like.

The co-cast ingot or other cast product can be processed by any means known to those of ordinary skill in the art. Optionally, the processing steps can be used to prepare sheets. Such processing steps include, but are not limited to, homogenization, hot rolling, cold rolling, solution heat treatment, and an optional pre-aging step, as known to those of ordinary skill in the art.

In the homogenization step of a DC casting process, the co-cast ingot described herein is heated to a temperature ranging from about 450° C. to about 600° C. For example, the ingot can be heated to a temperature of about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., or about 600° C. The ingot is then allowed to soak (i.e., held at the indicated temperature) for a period of time. In some examples, the total time for the homogenization step, including the heating and soaking phases, can be up to 24 hours. For example, the ingot can be heated up to 550° C. and soaked, for a total time of up to 18 hours for the homogenization step. Optionally, the ingot can be heated to below 500° C. and soaked, for a total time of greater than 18 hours for the homogenization step.

Following the homogenization step of the co-cast ingot, a hot rolling step can be performed. Prior to the start of hot rolling, the homogenized ingot can be allowed to cool to a temperature of from about 300° C. to about 450° C. For example, the homogenized ingot can be allowed to cool to a temperature of from about 325° C. to about 425° C. or from about 350° C. to about 400° C. The ingots can then be hot rolled at a temperature between 300° C. to 450° C. to form a hot rolled plate, a hot rolled shate or a hot rolled sheet having a gauge of from about 3 mm to about 200 mm (e.g., 3 mm, 4 mm, 5 mm, 6 mm, 7 mm, 8 mm, 9 mm, 9.5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 110 mm, 120 mm, 130 mm, 140 mm, 150 mm, 160 mm, 170 mm, 180 mm, 190 mm, 200 mm, or anywhere in between).

Optionally, the cast product can be a continuously cast product that can be allowed to cool after a high temperature continuous casting step to a temperature of from about 300° C. to about 450° C. For example, the continuously cast product can be allowed to cool to a temperature of from about 325° C. to about 425° C. or from about 350° C. to about 400° C. The continuously cast product can then be hot rolled at a temperature of from about 300° C. to about 450° C. to form a hot rolled plate, a hot rolled shate or a hot rolled sheet having a gauge of from about 3 mm to about 200 mm (e.g., 3 mm, 4 mm, 5 mm, 6 mm, 7 mm, 8 mm, 9 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 110 mm, 120 mm, 130 mm, 140 mm, 150 mm, 160 mm, 170 mm, 180 mm, 190 mm, 200 mm, or anywhere in between). During hot rolling, temperatures and other operating parameters can be controlled so that the temperature of the clad alloy hot rolled product upon exit from the hot rolling mill is no more than about 470° C., no more than about 450° C., no more than about 440° C., or no more than about 430° C.

The clad plate, shate, or sheet can then be cold rolled using conventional cold rolling mills and technology. Optionally, the cold rolled clad product (e.g., sheet or shate) can have a gauge of from about 0.5 mm to about 10 mm, e.g., between about 0.7 mm to about 6.5 mm. Optionally, the cold rolled clad sheet can have a gauge of 0.5 mm, 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, or 10.0 mm. The cold rolling can be performed to result in a final gauge thickness that represents a gauge reduction of up to about 85% (e.g., up to about 10%, up to about 20%, up to about 30%, up to about 40%, up to about 50%, up to about 60%, up to about 70%, up to about 80%, or up to about 85% reduction). Optionally, an interannealing step can be performed during the cold rolling step. The interannealing step can be performed at a temperature of from about 300° C. to about 450° C. (e.g., about 310° C., about 320° C., about 330° C., about 340° C., about 350° C., about 360° C., about 370° C., about 380° C., about 390° C., about 400° C., about 410° C., about 420° C., about 430° C., about 440° C., or about 450° C.). In some cases, the interannealing step comprises multiple processes. In some non-limiting examples, the interannealing step includes heating the cold rolled clad plate, shate, or sheet to a first temperature for a first period of time followed by heating to a second temperature for a second period of time. For example, the cold rolled clad plate, shate, or sheet can be heated to about 410° C. for about 1 hour and then heated to about 330° C. for about 2 hours.

Subsequently, the clad plate, shate, or sheet can undergo a solution heat treatment step. The solution heat treatment step can include any conventional treatment for the clad sheet which results in solutionizing of the soluble particles. The clad plate, shate, or sheet can be heated to a peak metal temperature (PMT) of up to about 590° C. (e.g., from about 400° C. to about 590° C.) and soaked for a period of time at the temperature. For example, the clad plate, shate, or sheet can be soaked at about 550° C. for a soak time of up to about 30 minutes (e.g., 0 seconds, about 60 seconds, about 75 seconds, about 90 seconds, about 5 minutes, about 10 minutes, about 20 minutes, about 25 minutes, or about 30 minutes). After heating and soaking, the clad plate, shate, or sheet is rapidly cooled at rates greater than 50° C./second (° C./s) to a temperature from about 500° C. to about 200° C. In one example, the clad plate, shate, or sheet is cooled at a quench rate of above 200° C./s from a temperature of about 450° C. to a temperature of about 200° C. Optionally, the cooling rates can be faster in other cases.

After quenching, the clad plate, shate or sheet can optionally undergo a pre-aging treatment by reheating the plate, shate, or sheet before coiling. The pre-aging treatment can be performed at a temperature of from about 50° C. to about 150° C. for a period of time of up to about 6 hours. For example, the pre-aging treatment can be performed at a temperature of about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., or about 150° C. Optionally, the pre-aging treatment can be performed for about 30 minutes, about 1 hour, about 2 hours, about 3 hours, about 4 hours, about 5 hours, or about 6 hours. The pre-aging treatment can be carried out by passing the plate, shate, or sheet through a heating device, such as a device that emits radiant heat, convective heat, induction heat, infrared heat, or the like.

The co-cast ingots or other co-cast products described herein can also be used to make products in the form of plates or other suitable products. The products can be made using techniques as known to those of ordinary skill in the art. For example, plates including the clad products as described herein can be prepared by processing a co-cast ingot in a homogenization step or casting a co-cast product in a continuous caster followed by a hot rolling step. In the hot rolling step, the cast product can be hot rolled to a 200 mm thick gauge or less (e.g., from about 10 mm to about 200 mm). For example, the cast product can be hot rolled to a plate having a final gauge thickness of about 10 mm to about 175 mm, about 15 mm to about 150 mm, about 20 mm to about 125 mm, about 25 mm to about 100 mm, about 30 mm to about 75 mm, or about 35 mm to about 50 mm.

Methods of Using the Aluminum Alloy Products and Clad Aluminum Alloy Products

The aluminum alloy products and the clad aluminum alloy products described herein can each be used in automotive applications and other transportation applications, including aircraft and railway applications. For example, the aluminum alloy products and the clad aluminum alloy products can be used to prepare automotive structural parts, such as bumpers, side beams, roof beams, cross beams, pillar reinforcements (e.g., A-pillars, B-pillars, and C-pillars), inner panels, outer panels, side panels, inner hoods, outer hoods, or trunk lid panels. The aluminum alloy products and the clad aluminum alloy products and methods described herein can also be used in aircraft or railway vehicle applications, to prepare, for example, external and internal panels. In some examples, the aluminum alloy products and the clad aluminum alloy products can be used in aerospace structural and non-structural parts or in marine structural or non-structural parts.

The aluminum alloy products and the clad aluminum alloy products and methods described herein can also be used in electronics applications. For example, the aluminum alloy products and the clad aluminum alloy products and methods described herein can be used to prepare housings for electronic devices, including mobile phones and tablet computers. In some examples, the aluminum alloy products and the clad aluminum alloy products can be used to prepare housings for the outer casings of mobile phones (e.g., smart phones) and tablet bottom chassis.

The aluminum alloy products and the clad aluminum alloy products and methods described herein can also be used in other applications as desired. The aluminum alloy products described herein can be provided as aluminum alloy sheets and/or plates suitable for further processing by an end user. The clad aluminum alloy products described herein can be provided as clad aluminum alloy sheets and/or clad aluminum alloy plates suitable for further processing by an end user. For example, an aluminum alloy sheet or a clad aluminum alloy sheet can be further subjected to surface treatments by an end user for use as an architectural skin panel for aesthetic and structural purposes.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purposes.

Examples

Aluminum Alloys

Aluminum alloys were produced by direct chill casting to prepare a 70×220 mm ingot and scalping the ingot to 60×220 mm. The aluminum alloy samples were homogenized by adding heat at 50° C./h and holding for 10 hours at 550° C. Samples were then hot rolled to 9.5 mm. Coil cooling was simulated in a furnace shut down at 400° C. Samples were cold rolled to 1 mm. Samples were then solutionized at 570° C./60 s+10 s heating and the samples were then quenched using air fans. The samples in a T4 temper were then tested for mechanical properties, as detailed below.

As shown in Table 1, Comparative Alloy 1 was intended to be representative of the existing art and was prepared as a comparative to Example Alloys 1-6. Example Alloys 4 and 5 were prepared with an increased recycling content of up to 50 wt. % UBC.

TABLE 1

| Element | Aluminum Alloy Compositions (wt. %) | | | | | | |
| --- | --- | --- | --- | --- | --- | --- | --- |
| | Ex. Alloy 1 | Ex. Alloy 2 | Ex. Alloy 3 | Ex. Alloy 4 | Ex. Alloy 5 | Ex. Alloy 6 | Comp. Alloy 1 |
| Si | 0.34 | 0.35 | 0.35 | 0.37 | 0.38 | 0.40 | 0.12 |
| Mg | 1.17 | 1.39 | 1.16 | 1.18 | 1.37 | 1.43 | 4.36 |
| Fe | 0.21 | 0.20 | 0.19 | 0.29 | 0.34 | 0.25 | 0.26 |
| Cu | 0.12 | 0.11 | 0.28 | 0.14 | 0.36 | 0.35 | 0.03 |
| Mn | 0.09 | 0.08 | 0.08 | 0.40 | 0.34 | 0.22 | 0.32 |
| Cr | 0.01 | 0.01 | 0.01 | 0.01 | 0.01 | 0.014 | 0.03 |
| Ti | 0.02 | 0.02 | 0.02 | 0.02 | 0.02 | 0.02 | 0.02 |
| Zn | — | — | — | — | — | 0.014 | — |

All expressed in wt. %. Up to 0.25 wt. % impurities. "—" indicates not reported. Remainder is Al.

Aluminum Alloy Properties

Figure 3:
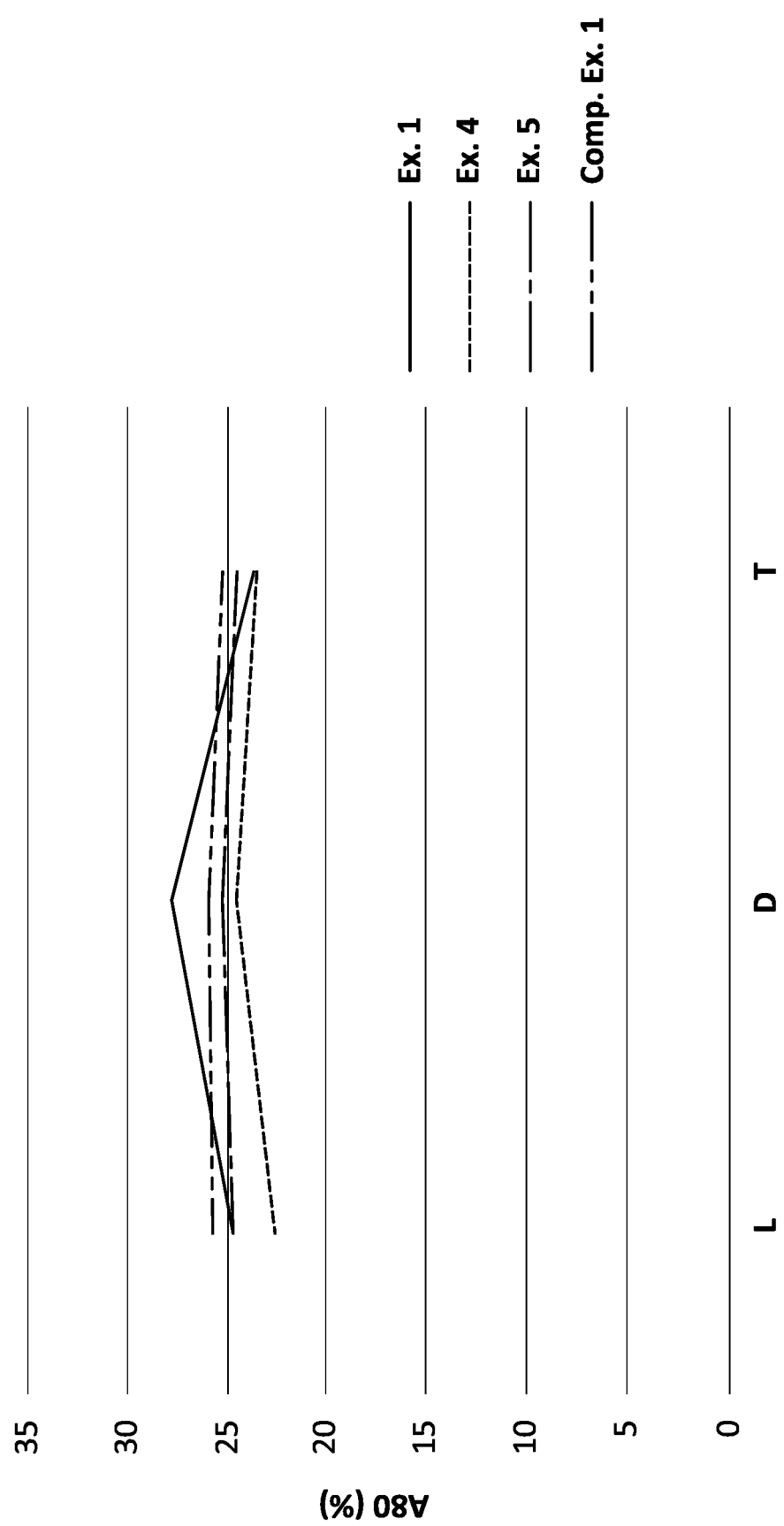
FIG. 3 is a graph of total elongation (A80) in longitudinal (L), diagonal (D), and transverse (T) directions for aluminum alloy samples.
Figure 4:
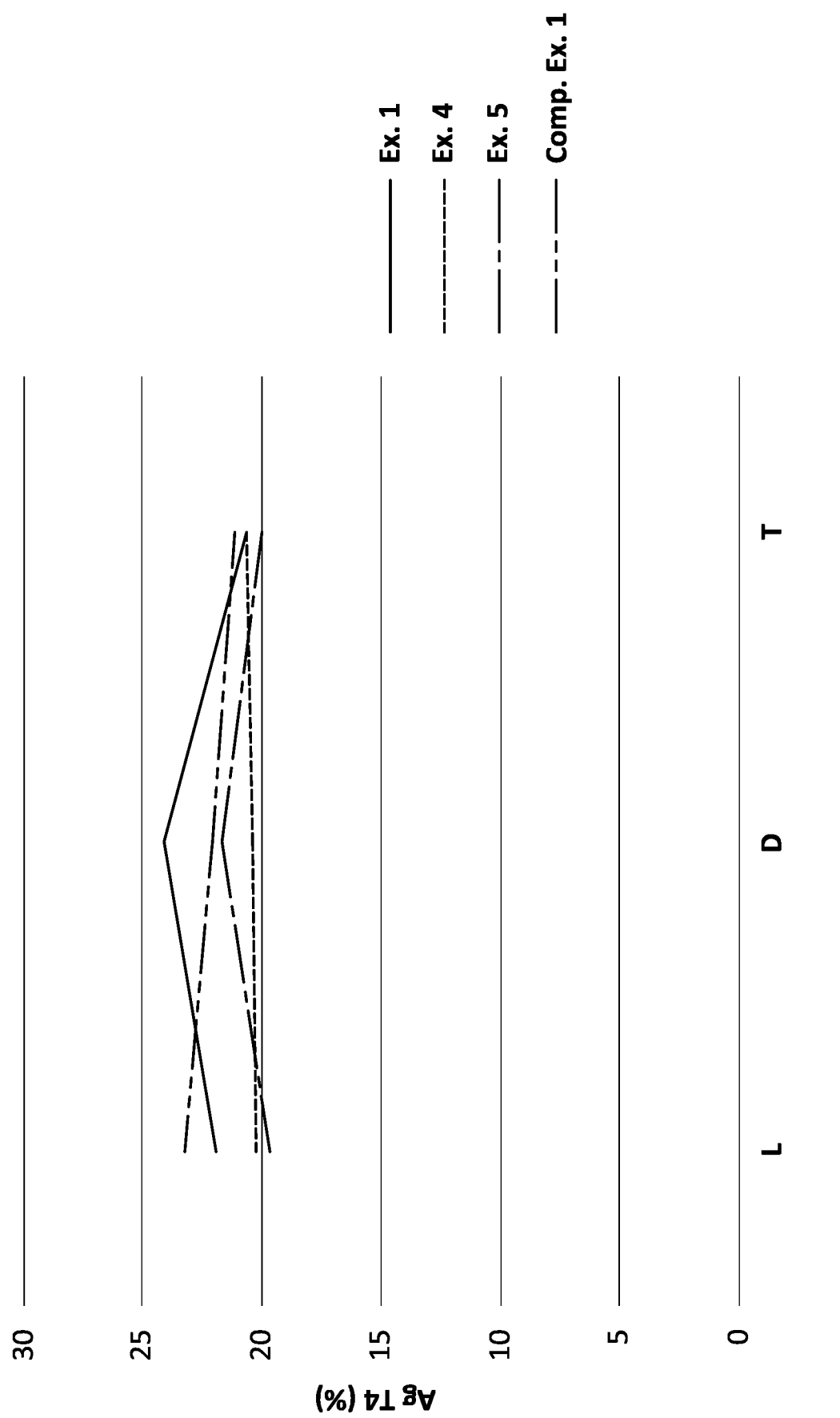
FIG. 4 is a graph of uniform elongation (Ag) in longitudinal (L), diagonal (D), and transverse (T) directions for aluminum alloy samples.

Tensile tests for Comparative Alloy 1 and Example Alloys 1-6 were performed. The formability of the samples was measured in the longitudinal (L), diagonal (D), and transverse (T) directions using ISO/EN A80 for total elongation and ISO/EN Ag for uniform elongation. FIGS. 1-4 show the A80 and Ag elongations (respectively) for Comparative Alloy 1 and Example Alloys 1-5. As shown in FIGS. 1 (total elongation) and 2 (uniform elongation), Example Alloys 1-3 show similar or better elongation than Comparative Alloy 1. Similarly, as shown in FIGS. 3 (total elongation) and 4 (uniform elongation), Example Alloys 4 and 5 with high recycled content show good elongation comparable to Comparative Alloy 1, which is unexpected for having high recycled content.

Figure 5:
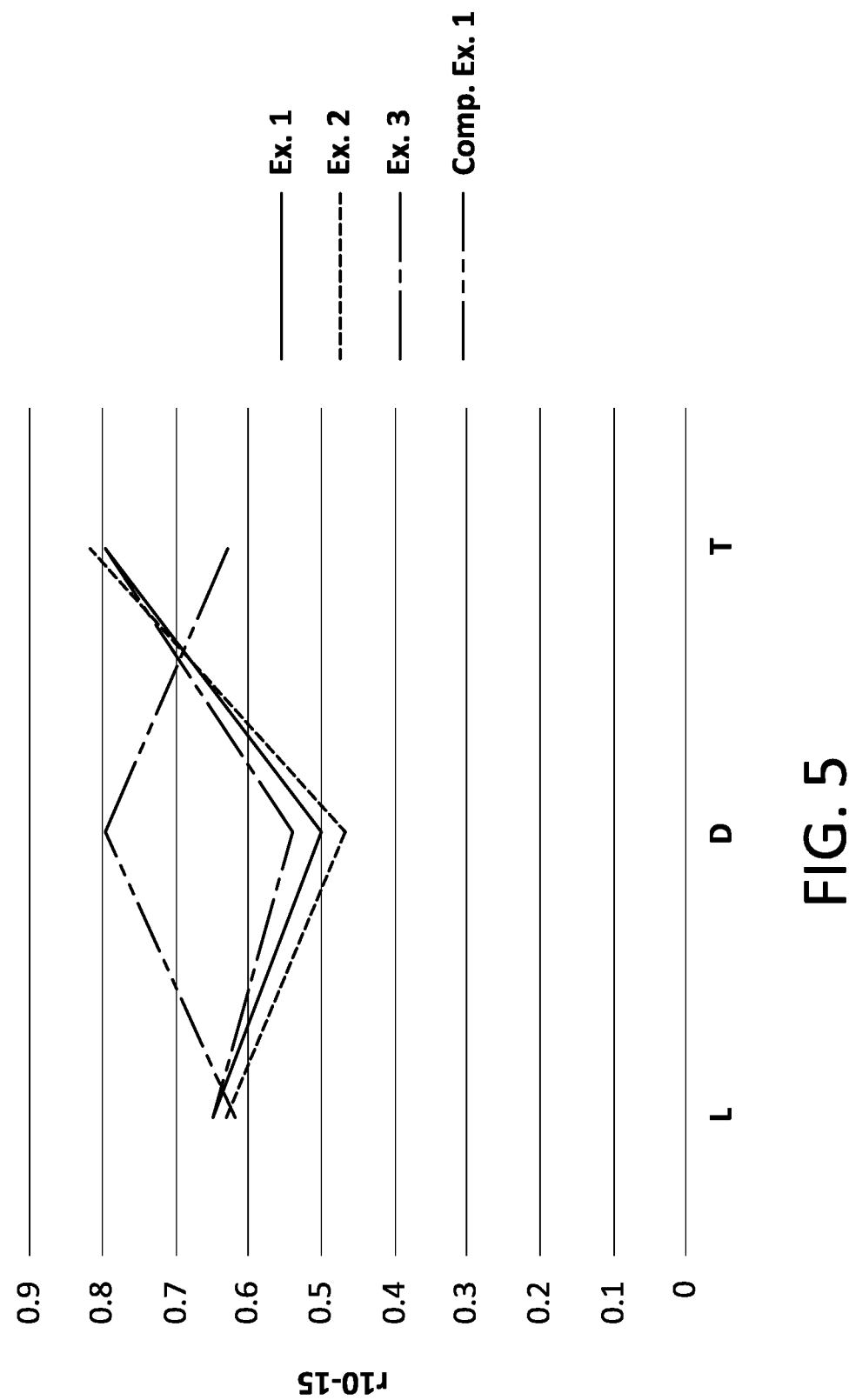
FIG. 5 is a graph showing r (10-15) values in longitudinal (L), diagonal (D), and transverse (T) directions for aluminum alloy samples.
Figure 6:
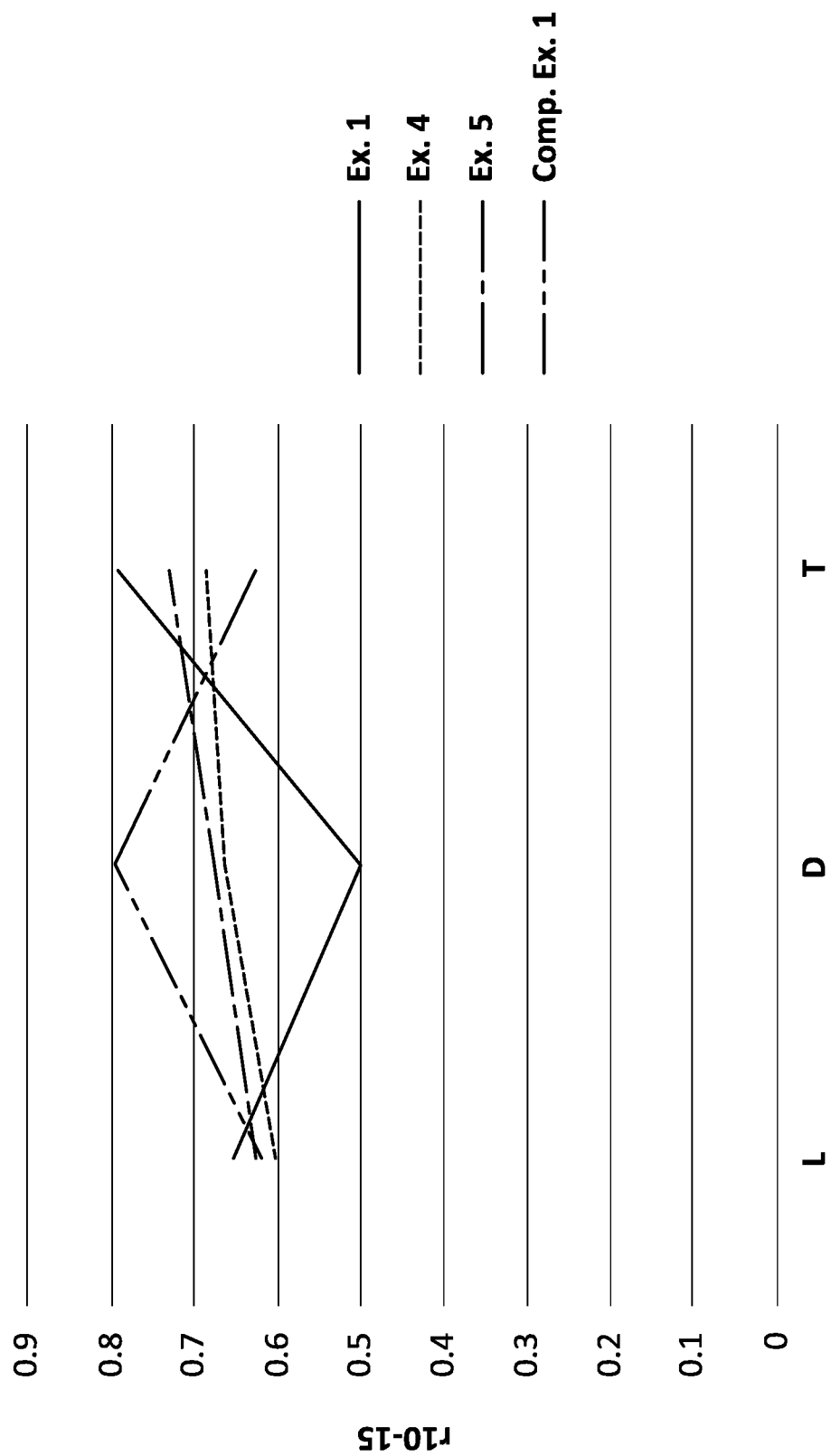
FIG. 6 is a graph showing r (10-15) values in longitudinal (L), diagonal (D), and transverse (T) directions for aluminum alloy samples.

Tensile tests were also used to measure r and n values for the samples using ISO 10113 (2006) and ISO 10275 (2007). As is apparent from FIG. 5, Example Alloys 1-3 show good r values at a strain range from 10% to 15%, in excess of Comparative Alloy 1 in the L and T directions. Similarly, FIG. 6 demonstrates that Example Alloys 4 and 5 show good r values against Comparative Alloy 1 while having high recycled content.

Figure 7:
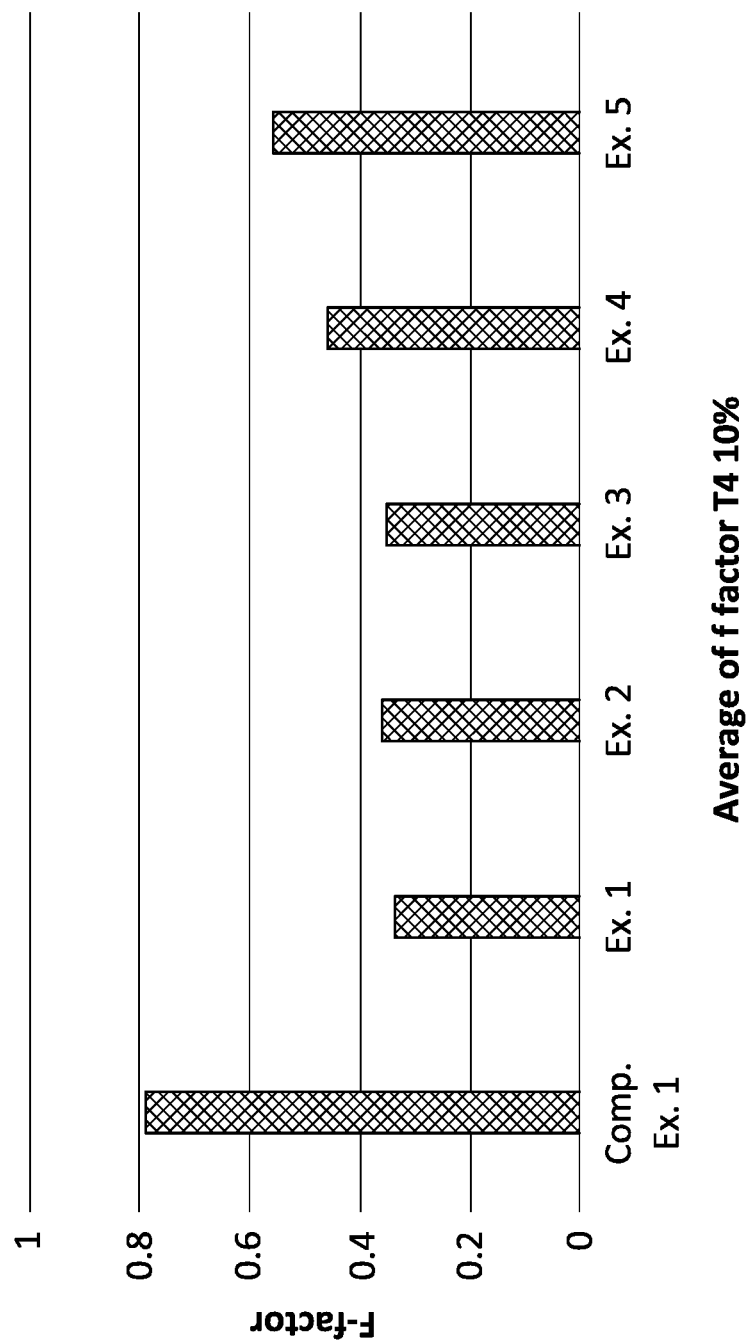
FIG. 7 is a graph showing bending behavior as measured by f-factor at 10% and 15% for aluminum alloy samples.

The bending properties of the samples were measured using an f-factor test (also known as the R/t ratio, where R is the radius of the tool (die) used and t is the thickness of the material) at 10% elongation. Results averaged over multiple runs are shown in FIG. 7. Example Alloys 1-5 demonstrated sufficient bending comparable to Comparative Alloy 1. Example Alloys 4 and 5 achieved this even with their high recycling content.

Example Alloy 6 was also tested. Reducing the Fe and Mn content resulted in increased n and r values and improved bending, while increasing Cr content lowered elongation but improved bending.

Illustrations

Illustration 1 is an aluminum alloy, comprising from about 0.5 wt. % to about 1.6 wt. % Mg; from about 0.20 wt. % to about 0.5 wt. % Si; up to about 1.0 wt. % Fe; up to about 0.5 wt. % Cu; up to about 0.5 wt. % Mn; up to about 0.3 wt. % Cr; up to about 0.3 wt. % Ti; up to about 0.5 wt. % Zn; up to about 0.25 wt. % impurities; and Al.

Illustration 2 is an aluminum alloy, comprising from about 0.6 wt. % to about 1.5 wt. % Mg; from about 0.3 wt. % to about 0.45 wt. % Si; up to about 0.5 wt. % Fe; up to about 0.4 wt. % Cu; up to about 0.4 wt. % Mn; up to about 0.25 wt. % Cr; up to about 0.15 wt. % Ti; up to about 0.4 wt. % Zn; up to about 0.20 wt. % impurities; and Al.

Illustration 3 is the aluminum alloy of any of the preceding or subsequent illustrations, wherein the Mg and Si are present in a ratio of from about 5:1 to about 2:1 of Mg to Si by weight.

Illustration 4 is the aluminum alloy of any of the preceding or subsequent illustrations, wherein the Mg and Si are present in a ratio of from about 4:1 to about 2:1 of Mg to Si by weight.

Illustration 5 is the aluminum alloy of any of the preceding or subsequent illustrations, further comprising from about 0.01 wt. % to about 0.5 wt. % Cu.

Illustration 6 is the aluminum alloy of any of the preceding or subsequent illustrations, further comprising from about 0.01 wt. % to about 0.5 wt. % Mn.

Illustration 7 is the aluminum alloy of v, further comprising from about 0.01 wt. % to about 0.25 wt. % Ti.

Illustration 8 is the aluminum alloy of any of the preceding or subsequent illustrations, further comprising from about 0.01 wt. % to about 1.0 wt. % Fe.

Illustration 9 is the aluminum alloy of any of the preceding or subsequent illustrations, further comprising from about 0.005 wt. % to about 0.30 wt. % Cr.

Illustration 10 is the aluminum alloy of any of the preceding or subsequent illustrations, further comprising from about 0.60 wt. % to about 1.4 wt. % Mg.

Illustration 11 is the aluminum alloy of any of the preceding or subsequent illustrations, further comprising from about 0.25 wt. % to about 0.41 wt. % Si.

Illustration 12 is the aluminum alloy of any of the preceding or subsequent illustrations, further comprising from about 0.30 wt. % to about 0.40 wt. % Si.

Illustration 13 is the aluminum alloy of any of the preceding or subsequent illustrations, wherein the aluminum alloy, when in a T8x temper, has a yield strength (Rp0.2) of from about 160 MPa to about 230 MPa tested according to ISO 6892-1 (2016).

Illustration 14 is the aluminum alloy of any of the preceding or subsequent illustrations, wherein the aluminum alloy has a bake hardening value from about 70 MPa to about 140 MPa.

Illustration 15 is the aluminum alloy of any of the preceding or subsequent illustrations, comprising at least about 40 wt. % recycled content.

Illustration 16 is the aluminum alloy of any of the preceding or subsequent illustrations, comprising at least about 40 wt. % UBC.

Illustration 17 is the aluminum alloy of any of the preceding or subsequent illustrations, wherein the combined concentration of Fe, Mn and Cu in the aluminum alloy is at least 0.7 wt. %.

Illustration 18 is the aluminum alloy of any of the preceding or subsequent illustrations, wherein the combined concentration of Fe, Mn, and Cu in the aluminum alloy is between about 0.9 wt. % and about 3.0 wt. %.

Illustration 19 is the aluminum alloy of any of the preceding or subsequent illustrations, wherein the aluminum alloy is a core layer in a clad product.

Illustration 20 is a monolithic sheet, comprising the aluminum alloy of any of the previous illustrations.

Illustration 21 is a clad aluminum alloy product, comprising: a core layer having a first side and a second side; and a first clad layer in contact with the first side of the core layer, wherein the core layer comprises from about 0.5 wt. % to about 1.6 wt. % Mg and from about 0.2 wt. % to about 0.5 wt. % Si.

Illustration 22 is the clad aluminum alloy product any of the preceding or subsequent illustrations, wherein the Mg and Si are present in the core layer at a ratio of from about 5:1 to about 2:1 of Mg to Si by weight.

Illustration 23 is the clad aluminum alloy product any of the preceding or subsequent illustrations, wherein the core layer comprises from about 0.60 wt. % to about 1.4 wt. % Mg.

Illustration 24 is the clad aluminum alloy product any of the preceding or subsequent illustrations, wherein the core layer comprises from about 0.30 wt. % to about 0.40 wt. % Si.

Illustration 25 is the clad aluminum alloy product any of the preceding or subsequent illustrations, wherein the first clad layer has a thickness of about 0.05 mm to about 0.80 mm.

Illustration 26 is the clad aluminum alloy product any of the preceding or subsequent illustrations, wherein the core layer has a thickness of about 0.7 to about 2.3 mm.

Illustration 27 is the clad aluminum alloy product any of the preceding or subsequent illustrations, further comprising a second clad layer in contact with the second side of the core layer.

Illustration 28 is the clad aluminum alloy product any of the preceding or subsequent illustrations, wherein the first clad layer comprises an 1xxx series aluminum alloy, 2xxx series aluminum alloy, a 3xxx series aluminum alloy, a 4xxx series alloy, a 5xxx series aluminum alloy, a 6xxx series aluminum alloy, a 7xxx series aluminum alloy, or an 8xxx series aluminum alloy.

Illustration 29 is the clad aluminum alloy product any of the preceding or subsequent illustrations, wherein the clad aluminum alloy product when in a T8x temper has a yield strength of at least about 150 MPa.

Illustration 30 is the clad aluminum alloy product any of the preceding or subsequent illustrations, wherein the clad aluminum alloy product has a total elongation above 20% in all directions.

Illustration 31 is the clad aluminum alloy product any of the preceding or subsequent illustrations, wherein the clad aluminum alloy product is a sheet, a plate, an electronic device housing, an automotive structural part, an aerospace structural part, an aerospace non-structural part, a marine structural part, or a marine non-structural part.

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

What is claimed is:

1. A clad aluminum alloy product, comprising:
   a core layer having a first side and a second side; and
   a first clad layer in contact with the first side of the core layer;
   wherein the core layer comprises a heat-treated aluminum alloy including:
   from 0.5 wt. % to 1.6 wt. % Mg;
   from 0.2 wt. % to 0.5 wt. % Si;
   up to 0.5 wt. % Fe;
   up to 0.5 wt. % Cu;
   up to 0.5 wt. % Mn;
   from 0.01 wt. % to 0.3 wt. % Ti; and
   balance Al, wherein a combined concentration of Fe, Mn, and Cu is at least 0.7 wt. %;
   wherein the first clad layer comprises an 1xxx series aluminum alloy, 2xxx series aluminum alloy, a 3xxx series aluminum alloy, a 5xxx series aluminum alloy, a 7xxx series aluminum alloy, or an 8xxx series aluminum alloy;
   wherein the core layer has an r value in all directions; and
   wherein the aluminum alloy of the core layer is in T8x temper.

2. The clad aluminum alloy product of claim 1, wherein in the aluminum alloy of the core layer:
   the amount of Mg is from 0.6 wt. % to 1.5 wt. %;
   the amount of Si is from 0.3 wt. % to 0.45 wt. %;
   the amount of Cu is up to 0.4 wt. %;
   the amount of Mn is up to 0.4 wt. %;
   the amount of Cr is up to 0.25 wt. %;
   the amount of Ti is from 0.01 wt. % to 0.15 wt. %;
   the amount of Zn is up to 0.4 wt. %; and
   the amount of impurities is up to 0.20 wt. %.

3. The clad aluminum alloy product of claim 1, wherein in the aluminum alloy of the core layer the Mg and Si are present in a ratio of from 5:1 to 2:1 of Mg to Si by weight.

4. The clad aluminum alloy product of claim 1, wherein in the aluminum alloy of the core layer, the Mg and Si are present in a ratio of from 4:1 to 2:1 of Mg to Si by weight.

5. The clad aluminum alloy product of claim 1, wherein in the aluminum alloy of the core layer:
   the amount of Mg is from 0.7 wt. % to 1.5 wt. %;
   the amount of Si is from 0.25 wt. % to 0.45 wt. %;
   the amount of Fe is from 0.01 wt. % to 0.5 wt. %;
   the amount of Cu is from 0.01 wt. % to 0.5 wt. %;
   the amount of Mn is from 0.01 wt. % to 0.5 wt. %;
   the amount of Cr is from 0.005 wt. % to 0.3 wt. %;
   the amount of Ti is from 0.01 wt. % to 0.25 wt. %;
   the amount of Zn is up to 0.4 wt. %; and
   the amount of impurities is up to 0.20 wt. %.

6. The clad aluminum alloy product of claim 1, wherein the aluminum alloy of the core layer has a yield strength (Rp0.2) of from 160 MPa to 230 MPa when tested according to ISO 6892-1 (2016).

7. The clad aluminum alloy product of claim 1, wherein the aluminum alloy of the core layer has a bake hardening value from 70 MPa to 140 MPa.

8. The clad aluminum alloy product of claim 1, wherein the aluminum alloy of the core layer comprises at least 40 wt. % recycled content.

9. The clad aluminum alloy product of claim 1, wherein the aluminum alloy of the core layer comprises at least 40 wt. % UBC.

10. The clad aluminum alloy product of claim 1, wherein the combined concentration of Fe, Mn and Cu in the aluminum alloy of the core layer is at least 0.8 wt. %.

11. The clad aluminum alloy product of claim 1, wherein the first clad layer has a thickness of from 0.05 mm to 0.80 mm.

12. The clad aluminum alloy product of claim 1, wherein the core layer has a thickness of from 0.7 to 2.3 mm.

13. The clad aluminum alloy product of claim 1, further comprising a second clad layer in contact with the second side of the core layer.

14. The clad aluminum alloy product of claim 1, wherein the clad aluminum alloy product has a yield strength of at least 150.

15. The clad aluminum alloy product of claim 1, wherein the clad aluminum alloy product is a sheet, a plate, an electronic device housing, an automotive structural part, an aerospace structural part, an aerospace non-structural part, a marine structural part, or a marine non-structural part.

16. The clad aluminum alloy product of claim 1, wherein the core layer has an r value in all directions of at least 0.45 as measured by ISO 10113 (2006).

* * * * *